United States Patent
AbdelAziz et al.

(10) Patent No.: US 7,656,822 B1
(45) Date of Patent: Feb. 2, 2010

(54) METHOD AND APPARATUS FOR DECENTRALIZED DEVICE AND SERVICE DESCRIPTION AND DISCOVERY

(75) Inventors: Mohamed M. AbdelAziz, Santa Clara, CA (US); Juan Carlos Soto, Kensington, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 828 days.

(21) Appl. No.: 10/974,246

(22) Filed: Oct. 27, 2004

Related U.S. Application Data

(63) Continuation-in-part of application No. 10/951,931, filed on Sep. 28, 2004.

(60) Provisional application No. 60/531,783, filed on Dec. 22, 2003.

(51) Int. Cl.
  *H04L 12/28* (2006.01)
  *H04L 12/56* (2006.01)
  *G06F 15/173* (2006.01)

(52) U.S. Cl. .................. 370/255; 370/401; 709/226

(58) Field of Classification Search ............ 370/384
  See application file for complete search history.

(56) References Cited

U.S. PATENT DOCUMENTS

| | | | | |
|---|---|---|---|---|
| 5,920,699 | A * | 7/1999 | Bare | 709/225 |
| 6,594,700 | B1 * | 7/2003 | Graham et al. | 709/230 |
| 6,618,764 | B1 | 9/2003 | Shteyn | |
| 2002/0052966 | A1 * | 5/2002 | Isomura et al. | 709/230 |
| 2002/0116593 | A1 * | 8/2002 | Kazar et al. | 711/202 |
| 2002/0143944 | A1 * | 10/2002 | Traversat et al. | 709/225 |
| 2003/0033517 | A1 * | 2/2003 | Rutherglen et al. | 713/153 |
| 2003/0217122 | A1 * | 11/2003 | Roese et al. | 709/219 |
| 2004/0128345 | A1 * | 7/2004 | Robinson et al. | 709/203 |
| 2005/0097087 | A1 | 5/2005 | Punaganti Venkata et al. | |

OTHER PUBLICATIONS

Li Gong, Project JXTA: A Technology Overview, Sun Microsystems, Inc., Palto Alto California, Apr. 25, 2001.
Sun Microsystems, Inc., Project JXTA: An Open, Innovative Collaboration, Apr. 25, 2001.
Erik Guttman, Autoconfiguration for IP Networking: Enabling Local Communication, Sun Microsystems, Inc., Germany, May-Jun. 2001.
Heath Johns, Understanding Zeroconf and Multicast DNS, Wireless Devcenter, Dec. 12, 2002.
U.S. Appl. No. 10/951,931, filed Sep. 28, 2004.

\* cited by examiner

*Primary Examiner*—William Trost, IV
*Assistant Examiner*—Andrew Chriss
(74) *Attorney, Agent, or Firm*—Robert C Kowert; Meyertons, Hood, Kivlin, Kowert & Goetzel, P.C.

(57) ABSTRACT

A resource discovery and description mechanism for decentralized device and service description and discovery in networking environments is described that generates advertisements in a uniform description format to describe resources on a network. The mechanism may translate resource descriptions from other resource description and discovery protocols to generate the advertisements. The advertisements may be used for cross-network discovery and access of the resources. An advertisement may include, but is not limited to, physical endpoints, virtual endpoints, user-extensible metadata, location information, and a universal unique identifier (UUID) for the associated resource. If a resource cannot provide a UUID, the mechanism generates a UUID for the resource. One embodiment may support proxy nodes for generating advertisements for resources that cannot participate directly in the resource discovery and description mechanism. These proxy nodes may also serve as a proxy between local subnetwork discovery and cross-network discovery of the advertisements.

43 Claims, 13 Drawing Sheets

| Resource metadata<br>- Name<br>- Type<br>- Manufacturer<br>... |
|---|
| UUID |
| Resource description |
| Physical endpoint(s) |
| Virtual endpoint(s) |
| Location information |
| Signature |

FIG. 2

```
<Name> Resource Name </Name>
<Type> Resource Type </Type>
<Manufacturer> Manufacturer </Manufacturer>
<ID> UUID </ID>
<Description> Resource Description </Description>
<Physical Endpoint> Physical endpoint</Physical Endpoint>
<Virtual Endpoint> Virtual endpoint </Virtual Endpoint>
<Location> Location (e.g., GPS) information </Location>
```

FIG. 3

```
<SvrAdvertisement>
   <Name> Device Name </Name>
   <ID>uuid:....</ID>
   <Description> (description) </Description>
   <PipeID>xxxx:uuid....</PipeID>
   <Type> (type) </Type>
   <Latitude> 0.0 </Latitude>
   ...
</SvrAdvertisement>
```

METHOD AND APPARATUS FOR DECENTRALIZED DEVICE AND SERVICE DESCRIPTION AND DISCOVERY

PRIORITY INFORMATION

This application claims benefit of priority of provisional application Ser. No. 60/531,783 entitled "Mechanism for Device and Service Description, Transformation, Discovery, and Connectivity in a Peer-to-Peer Network Environment" filed Dec. 22, 2003, whose inventors are Mohamed M. AbdelAziz and Juan C. Soto. This application is also a continuation-in-part of U.S. patent application Ser. No. 10/951,931 entitled "Method and Apparatus for Data Communication Tunneling Channels" filed Sep. 28, 2004, whose inventors are Mohamed M. AbdelAziz and Juan Carlos Soto, which claims benefit of priority of provisional application Ser. No. 60/531,783 entitled "Mechanism for Device and Service Description, Transformation, Discovery, and Connectivity in a Peer-to-Peer Network Environment" filed Dec. 22, 2003, whose inventors are Mohamed M. AbdelAziz and Juan C. Soto.

BACKGROUND OF THE INVENTION

1. Field of the Invention

This invention relates to peer-to-peer networking, and more particularly to decentralized device and service description and discovery in a peer-to-peer networking environment.

2. Description of the Related Art

Peer-to-Peer Networking

The term peer-to-peer networking or computing (often referred to as P2P) may be applied to a wide range of technologies that greatly increase the utilization of information, bandwidth, and computing resources in the Internet. Frequently, these P2P technologies adopt a network-based computing style that neither excludes nor inherently depends on centralized control points. In addition to improving the performance of information discovery, content delivery, and information processing, such a style also can enhance the overall reliability and fault-tolerance of computing systems.

FIGS. 1A and 1B are examples illustrating the peer-to-peer model. FIG. 1A shows two peer devices 104A and 104B that are currently connected. Either of the two peer devices 104 may serve as a client of or a server to the other device. FIG. 1B shows several peer devices 104 connected over the network 106 in a peer group. In the peer group, any of the peer devices 104 may serve as a client of or a server to any of the other devices.

JXTA

Sun Microsystems' JXTA™ is an exemplary peer-to-peer platform. Peer-to-peer platforms such as JXTA may provide protocols for building networking applications that thrive in dynamic environments. JXTA technology is a set of open protocols that allow any connected device on the network ranging from cell phones and wireless PDAs to PCs and servers to communicate and collaborate in a peer-to-peer (P2P) manner. JXTA peers create a virtual network where any peer can interact with other peers and resources directly even when some of the peers and resources are behind firewalls and NATs or are on different network transports. In JXTA, every peer is identified by an ID, unique over time and space. Peer groups are user-defined collections of entities (peers) that may share a common interest. Peer groups are also identified by unique IDs. Peers may belong to multiple peer groups, discover other entities and peer resources (e.g. peers, peer groups, services, content, etc.) dynamically, and publish themselves and resources so that other peers can discover them.

Service Location Protocol (SLP)

The Service Location Protocol (SLP) is a protocol or method of organizing and locating the resources (such as printers, disk drives, databases, e-mail directories, and schedulers) in a network. SLP is intended to give users an easy-to-use interface to a network's resource information. The protocol defines and oversees communications and operations that take place among entities called user agents (subscribers or workstations), service agents (peripherals and resources), and directory agents (peripherals and resources within service agents). Rearrangement or maintenance of services, or installing new devices, is possible without the need for reconfiguring individual workstations.

Multicast DNS (MDNS)

Multicast DNS (MDNS) is a mechanism for using familiar DNS programming interfaces, packet formats and operating semantics in a small network where no conventional DNS server has been installed.

Universal Plug and Play (UPnP)

Universal Plug and Play (UPnP) is a standard that uses Internet and Web protocols to enable devices such as PCs, peripherals, intelligent appliances, and wireless devices to be plugged into a network and to automatically know about each other. With UPnP, when a user plugs a device into the network, the device will configure itself, acquire a TCP/IP address, and use a discovery protocol based on the Internet's Hypertext Transfer Protocol (HTTP) to announce its presence on the network to other devices.

Jini

Sun Microsystems' Jini™ network technology, which includes JavaSpaces Technology and Jini extensible remote invocation (Jini ERI), is an open architecture that enables developers to create network-centric services—whether implemented in hardware or software—that are highly adaptive to change. Jini technology may be used to build adaptive networks that are scalable, evolvable and flexible as typically required in dynamic computing environments.

Device/Service Description and Discovery Mechanisms

Conventional device/service description and discovery mechanisms used on networks, such as JINI, Apple Rendezvous, SLP, UPnP, DNS, and MDNS, have their own formats, and typically do not provide a way to uniquely identify resources across networks. These mechanisms typically do not interoperate, and many lack a discovery mechanism that is capable of spanning networks. These mechanisms typically either define enough to solve a specific device deployment such as a printer, or are limited to what they can describe by a size limitation imposed by the protocol.

Resources in subnetworks using at least some of these mechanisms may be named by humans; these names may not mean anything to other users that discover those resources from within or from without that subnetwork. In addition, there may be name collisions, which may cause problems in determining which resource is which, especially with mobile devices. For example, two or more users in such a subnetwork may name their local printer something like "My Printer". This can lead to problems on the network; for example, users may attempt to access resources they do not have access to, or are simply the wrong resource.

SUMMARY

Embodiments of a method and apparatus for decentralized device and service description and discovery in networking environments including, but not limited to, peer-to-peer networking environments are described. Embodiments may define generic device and service descriptions in a uniform description format in network environments, for example using markup language (e.g., XML) documents, which may be referred to herein as advertisements. These advertisements are extensible and self-defining. These advertisements may be indexed and stored within a distributed or, alternatively, centralized cache, where the cached advertisements may be queried for a specific device or service according to one or more of the fields of the advertisements. In one embodiment, description, discovery, and advertisement of devices and/or services may be implemented using an underlying peer-to-peer platform such as the JXTA peer-to-peer platform.

In embodiments, a resource discovery and description mechanism may generate the advertisements to describe devices and/or services (which may be referred to as resources) on a network. The resource discovery and description mechanism may transform or transcode resource descriptions formatted according to other resource description and discovery protocols, such as JINI, Apple Rendezvous, SLP, UPnP, DNS, and Multicast DNS, to generate the resource advertisements in a generic, uniform, network resource description format. The resource advertisements may then be used for cross-network discovery and access of resources on and from subnetworks that support various ones of the resource description and discovery protocols.

The advertisements may include physical interface endpoints, as well as any virtual endpoints that may be used to virtually interface with a device or service if it is not possible or desirable to directly interface with the device through a physical endpoint. The advertisements may include user-extensible metadata about a device or service including one or more of, but not limited to, name, type, manufacturer, location information (e.g., GPS information), and device or service description.

The advertisements may also include a universally unique identifier (UUID) for each resource. The UUID may be useful, for example, when dealing with resource discovery, by providing a mechanism for uniquely identifying resources both in a subnetwork and across subnetworks. UUIDs provide a mechanism to uniquely identify any resource within a subnetwork or LAN (Local Area Network) as well as across subnetworks or a WAN (Wide Area Network). If a resource is able to self-assign or otherwise obtain a UUID, that UUID may be used in the advertisement. If the resource is not able to provide a UUID, the resource discovery and description mechanism generates a UUID for the resource and assigns the UUID to the resource.

One embodiment may support proxy nodes or a proxy service or layer on the network for generating advertisements as described herein on behalf of resources such as legacy devices that are not configured to participate directly in the resource discovery and description mechanism and/or that cannot self-generate advertisements. These proxy nodes may also serve as a bridge or proxy between local subnetwork discovery and cross-network discovery of the advertisements.

BRIEF DESCRIPTION OF THE DRAWINGS

FIG. 2 is a block diagram illustrating fields in an exemplary advertisement according to one embodiment.

FIG. 3 illustrates an exemplary advertisement in a markup language (e.g., XML) format according to one embodiment

Figure 1A:
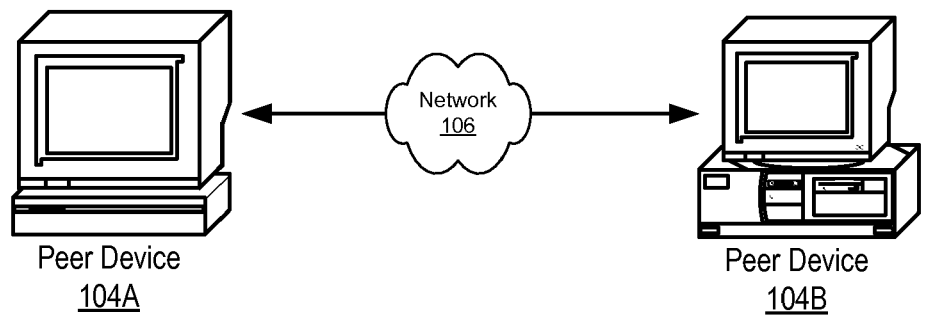
FIG. 1A illustrates a prior art example of two devices that are currently connected as peers.
Figure 1B:
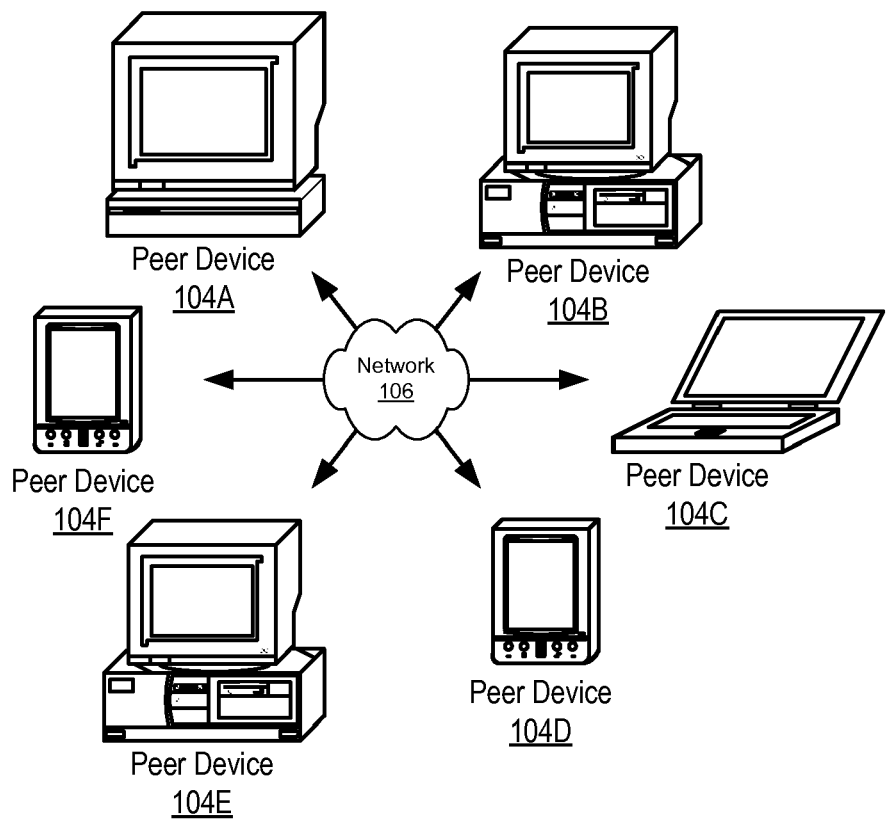
FIG. 1B illustrates a prior art example of several peer devices connected over the network in a peer group.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a method and apparatus for decentralized device and service description and discovery in networking environments including, but not limited to, peer-to-peer networking environments are described. Embodiments may define generic device and service descriptions in a uniform description format in network environments, for example using markup language (e.g., XML) documents, which may be referred to herein as advertisements. These advertisements are extensible and self-defining. These advertisements may be indexed and stored within a distributed or, alternatively, centralized cache, where the cached advertisements may be queried for a specific device or service according to one or more of the fields of the advertisements. In one embodiment, description, discovery, and advertisement of devices and/or services may be implemented using an underlying peer-to-peer platform such as the JXTA peer-to-peer platform.

In embodiments, a resource discovery and description mechanism may generate markup language (e.g., XML) documents (advertisements) to describe devices and/or services (which may be referred to as resources) on a network. The resource discovery and description mechanism may transform or transcode resource descriptions formatted according to other resource description and discovery protocols, such as JINI, Apple Rendezvous, SLP, UPnP, DNS, and Multicast DNS, to generate the resource advertisements in a generic, uniform, network resource description format. The resource advertisements may then be used for cross-network discovery and access of resources on and from subnetworks that support various ones of the resource description and discovery protocols. For example, a JINI service may be discovered and described in a markup language advertisement as described herein by the resource discovery and description mechanism, and the advertisement may then be exposed the service within an Apple Rendezvous network.

Embodiments of the resource discovery and description mechanism may provide a generic mechanism for describing, advertising, and discovering devices and/or services in a peer-to-peer network computing environment and/or in other network computing environments. The resource discovery and description mechanism may allow devices and/or services to be described, advertised, and discovered using physical and/or logical (virtual) addresses. The resource discovery and description mechanism may be used to describe, advertise, and discover devices (e.g. printers, disk drives, or any other networkable device) and/or services in terms of their capabilities; to discover, describe and advertise location (e.g. GPS location information) for the devices and/or services; and may allow the devices and/or services to participate in a network computing environment using physical and/or virtual addresses regardless of the devices' or services' underlying platforms, supported protocols, and/or locations.

In one embodiment of the resource discovery and description mechanism, description, discovery, and advertisement of devices and/or services may be implemented using an underlying peer-to-peer platform such as the JXTA peer-to-peer platform, and the resource discovery and description mechanism may provide a mechanism or mechanisms for interconnecting heterogeneous devices and/or services across a peer-to-peer platform computing environment. The resource discovery and description mechanism may provide a standard way to describe, advertise and discover devices and/or services in a peer-to-peer computing environment not provided by the underlying peer-to-peer platform. The resource discovery and description mechanism may allow devices and/or services in one environment (e.g. operating platform such as Solaris, protocols such as SLP and MDNS, etc.) to be exposed in other environments using different platforms and protocols. For example, a printer in a Solaris environment may be exposed to other systems in other environments, for example a Macintosh OS X (Mac OsX) environment, and accessed from the other system as if the printer was a device in that environment.

Some nodes and/or resources on a network may implement a schema or mechanism for self-generating the markup language advertisements as described herein. In one embodiment, in a subnetwork, every node or resource that participates in that subnetwork does not need to implement, directly support or understand the resource discovery and description mechanism and advertisements as described herein for the nodes and resources on that subnetwork to participate in the resource discovery and description mechanism. In one embodiment, only one node within a subnetwork needs to support the resource discovery and description mechanism, though more than one node or resource may do so. Other nodes or resources, such as legacy devices, may not implement such a schema or mechanism. Therefore, one embodiment may support proxy nodes or a proxy service or layer on the network for generating advertisements as described herein on behalf of resources such as legacy devices that are not configured to participate directly in the resource discovery and description mechanism and/or that cannot self-generate advertisements. These proxy nodes may also serve as a bridge or proxy between local subnetwork discovery and cross-network discovery of the markup language advertisements as described herein.

For example, in a subnetwork that supports the Macintosh OS X/MDNS environment, with 50 Macintoshes as nodes, only one of the nodes within the subnetwork may be required to include a software stack that supports an embodiment of the resource discovery and description mechanism to provide the services of the resource discovery and description mechanism to all the other nodes and resources within the subnetwork, though more than one node on the subnetwork may be so configured. A node configured to provide the services of the resource discovery and description mechanism to other nodes and resources within a subnetwork may be described herein as a proxy node. A proxy node in the Macintosh OS X/MDNS environment may, for example, be configured to take an advertisement for a device or service in another subnetwork formatted according to the resource discovery and description mechanism and describe the device or service in a Multicast DNS format within its subnetwork. The other nodes within that subnetwork would then be able to discover that device or service and bind to the device or service. Conversely, the proxy node may be configured to take a device or service description formatted according to its subnetwork (e.g., an MDNS device or service description) and transcode the device or service description to generate an advertisement formatted according to the resource discovery and description mechanism so that the device or service can be discovered and bound to from within other subnetworks on the network.

The advertisements may include physical interface endpoints, as well as any virtual endpoints that may be used to virtually interface with a device or service if it is not possible or desirable to directly interface with the device through a physical endpoint. The advertisements may include user-extensible metadata about a device or service including one or more of, but not limited to, name, type, manufacturer, location information (e.g., GPS information), and device or service description.

The advertisements may also include a universally unique identifier (UUID) for each resource. The UUID may be useful, for example, when dealing with resource discovery, by providing a mechanism for uniquely identifying resources both in a subnetwork and across subnetworks. UUIDs provide a mechanism to uniquely identify any resource within a subnetwork or LAN (Local Area Network) as well as across subnetworks or a WAN (Wide Area Network). If a resource is able to self-assign or otherwise obtain a UUID, that UUID may be used in the advertisement. If the resource is not able to provide a UUID, the resource discovery and description mechanism generates a UUID for the resource and assigns the UUID to the resource.

FIGS. 2 through 8 illustrate means for discovering resources on subnetworks of a network, means for generating advertisements in a uniform description format for the discovered resources, and means for publishing the advertisements on the network for discovery by the nodes on the subnetworks.

FIG. 2 is a block diagram illustrating fields in an exemplary advertisement according to one embodiment. The generic device and service descriptions (advertisements) may include fields indicating one or more of, but not limited to:

Physical interface endpoints of a resource.
Virtual endpoints of a resource. In one embodiment, a virtual endpoint may be a communications channel (e.g., JXTA pipe) endpoint.
Metadata about the resource, including one or more of, but not limited to:
Resource name.
Resource type.
Manufacturer.
Other resource description information.
Unique identifier (UUID) of a resource. In one embodiment, this may be a 128-bit identifier.
Resource location, for example Global Positioning (GPS) coordinates of a device.
Advertisement signature to insure authenticity (Authorization and/or authentication information).

One or more of the fields illustrated in FIG. 2 may be optional, and advertisements may include additional fields.

FIG. 3 illustrates an exemplary advertisement in a markup language (e.g., XML) format according to one embodiment. One or more of the fields illustrated in FIG. 3 may be optional. Note that the tag names used in this example are exemplary, and are not intended to be limiting. For example, in one embodiment, a virtual endpoint may be indicated as:

<PipeID>jxta:UUID</PipeID>

In one embodiment, location information may be indicated in two or more fields, for example as:

<Latitude>0.0</Latitude>
<Longitude>0.0</Longitude>

Location information, such as GPS information, may be useful, for example, to find the physical location of a device such as a printer, or for tracking mobile devices. To utilize GPS info, a device may include a GPS receiver, or the GPS location may be otherwise obtainable. An advertisement for a device may be updated with new location information if the device changes location. In one embodiment, the device, or alternatively a proxy for the device, has the responsibility of updating the location information in the advertisement if the device changes locations.

The UUID uniquely identifies a device or service. UUIDs for resources are unique in time and space. No two resources will have the same UUID. In one embodiment, if a discovered resource does not have a UUID, one will be assigned to the resource. UUIDs for a resource may be encoded to include resource-specific data such as a MAC address, a serial number, etc. The use of UUIDs overcomes problems inherent with users in subnetworks using names as "unique" identifiers, problems such as collisions. For example, some device/service description subnetworks may allow users to name their local resources, such as printers. In these subnetworks, two or more users may name their local resources the same, for example "My Printer."

In one embodiment, the markup language (e.g., XML) advertisements are extensible, and no size restriction is placed on the advertisements. Manufacturers, developers and users may extend and augment the advertisements by adding additional fields and/or augmenting existing fields, without concern about size of the advertisements or whether fields are defined or not. The extensible advertisements provide the user the ability to extend the device/service description to include human-interpretable metadata. This may help address problems with forward and backward compatibility.

Embodiments may provide the definition of physical, as well as virtual, endpoints of a resource. Thus, resources may be accessible directly within a LAN or subnetwork using the physical endpoint(s), or virtually within a WAN or across subnetworks using the virtual endpoint(s). Thus, resources may be accessed through the physical network using the physical endpoint(s) or through a virtual network across domains, firewalls, etc, using the virtual endpoint(s). In one embodiment, virtual endpoints may be defined as communications channels (e.g., JXTA pipes).

Some resource description and discovery protocols, such as UPNP and Multicast DNS, describe physical endpoints. These physical endpoints, however, may or may not be reachable across subnetworks. The virtual endpoints provided in the advertisements may be used to access devices or services that are not accessible via their physical endpoints. The advertisements expose the physical endpoints as well as the virtual endpoints. Exposing both physical and virtual endpoints allows advertised devices or services that are local to be accessed via their advertised physical endpoints, bypassing any transcribing information or transcribing layers that are used in reaching a virtual endpoint. Accessing a device or service via a virtual endpoint may go through one or more relays, for example, before realizing the device or service is actually locally accessible.

Figure 4:
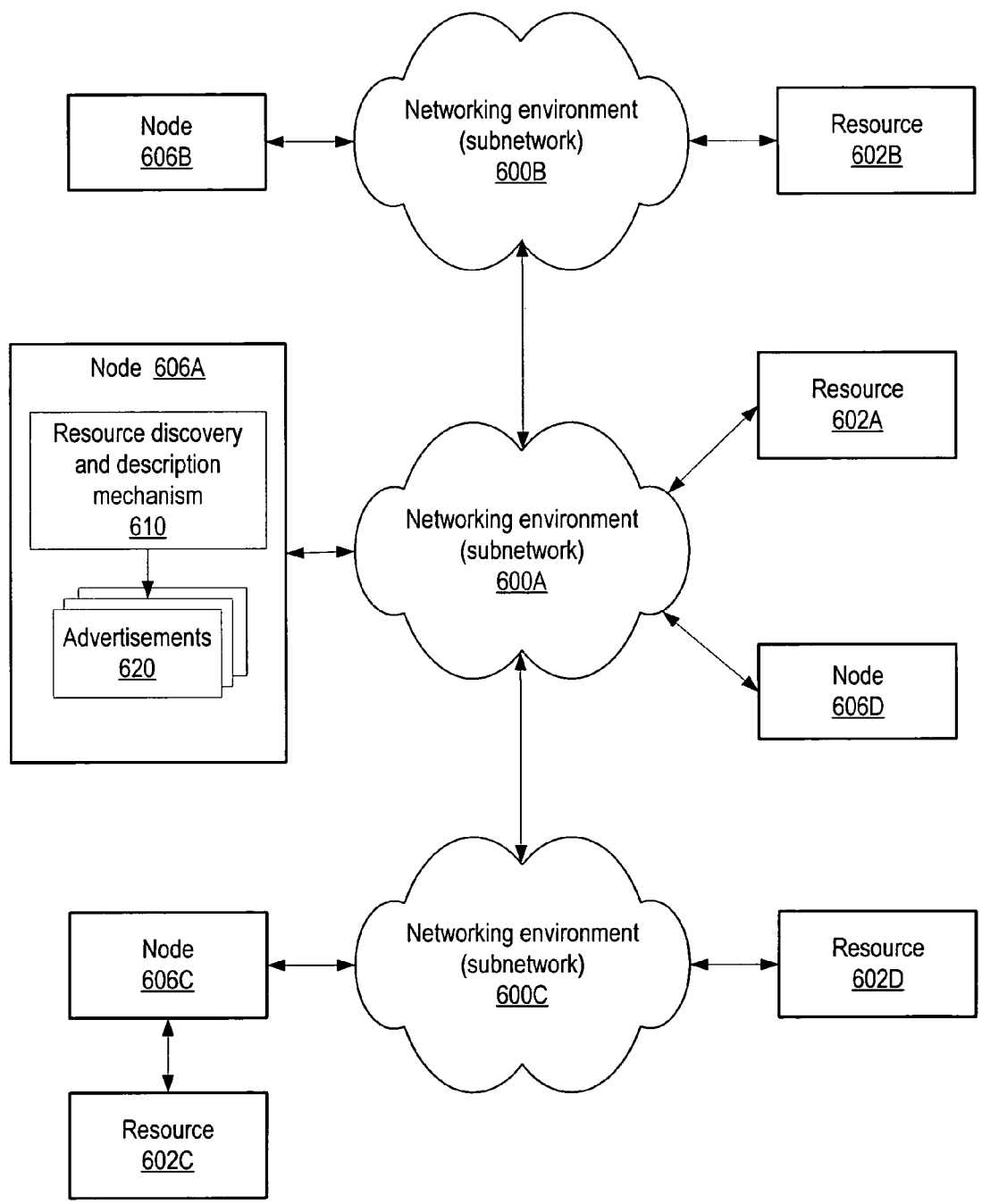
FIG. 4 illustrates an exemplary network including subnetworks, or distinct networking environments within the network, that implements decentralized device and service description and discovery according to one embodiment.

FIG. 4 illustrates an exemplary network including subnetworks, or distinct networking environments within the network, that implements decentralized device and service description and discovery according to one embodiment. Each networking environment 600 may include one or more nodes 606 and one or more resources 602. Two or more of the networking environments 600 may utilize a different device and service description and discovery protocol within the subnetwork, such as JINI, Apple Rendezvous, SLP, UPnP and DNS. Each of these mechanisms has its own formats for device and service description.

A resource 602 may be a device or a service implemented on one or more devices, and may be directly connected to the network, as is resource 602A, or provided through a node, as is resource 602C. Node 606A on networking environment 600A includes a resource discovery and description mechanism 610. Within networking environment 600A, advertisements as described herein may be used for device and service description and discovery. Networking environments 600 may use different device and service description and discovery protocols within their subnetwork. For example, networking environment 600B may be a Solaris/SLP environment, and networking environment 600C may be a Macintosh OS X/MDNS environment.

Resource discovery and description mechanism 610 may discover resource 602A on the local subnetwork, and may also discover resources 602B, 602C and 602D on the other subnetworks. Resource discovery and description mechanism 610 may generate markup language (e.g., XML) documents (advertisements 620) to describe the discovered resources 602 on the network. An advertisement 620 for a resource 602 may be transcoded from a device and service description formatted according to the device and service description and discovery protocol used in the networking environment 600 that includes the resource 602. These advertisements 620 may be indexed and stored within a distributed or, alternatively, centralized cache, and the cached advertisements 620 may be queried for a specific resource 602 by a discovery mechanism on any of the subnetworks according to one or more of the fields of the advertisements 620.

The advertisements 620 may include physical interface endpoints, as well as any virtual endpoints that may be used to virtually interface with a resource 602 if it is not possible or desirable to directly interface with the resource through a physical endpoint. The advertisements 620 may include user-extensible metadata about a resource 602 including one or more of, but not limited to, name, type, manufacturer, location information (e.g., GPS information), and resource description. The advertisements may also include a universally unique identifier (UUID) for each resource. The UUID may be useful, for example, when dealing with resource discovery, by providing a mechanism for uniquely identifying resources both in a subnetwork and across subnetworks. UUIDs provide a mechanism to uniquely identify any resource 620 on a network such as that illustrated in FIG. 4. If a resource 602 is able to self-assign or otherwise obtain a UUID, that UUID may be used in the advertisement. If the resource 602 is not able to provide a UUID, the resource discovery and description mechanism 610 generates a UUID for the resource 602 and assigns the UUID to the resource 602.

Nodes 606 on any of the subnetworks (networking environments 600) may then discover advertisements 620 for particular resources 602 on any of the subnetworks using one or more fields of the advertisements 620 to specify the particular resources. An advertisement 620 for a resource 602 on one subnetwork may be transcoded into a device and service description format used by the device and service description and discovery protocol in the subnetwork of the node 606 that discovered the advertisement 620.

In one embodiment, each subnetwork may include at least one node 606 that is configured to discover advertisements 620 on networking environment 600A. On networking environments 600B and 600C, this node may serve as a proxy node between other nodes and resources on the subnetwork and the resource discovery and description mechanism 610 on networking environment 600A. This proxy node may be configured to receive discovery requests from resource discovery and description mechanism 610 and to perform the requested discovery within its subnetwork according to the device and service description and discovery protocol used in the subnetwork. This proxy node may also be configured to receive discovery requests from nodes 606 within its subnetwork according to the device and service description and discovery protocol used in the subnetwork and to use the information in those discovery requests to discover advertisements 620 on networking environment 600A for resources 602 specified by the discovery requests. This proxy node may also be configured to perform the transcoding from the advertisement format described herein to the device and service description format used by the device and service description and discovery protocol in its particular subnetwork and vice versa.

Figure 5A:
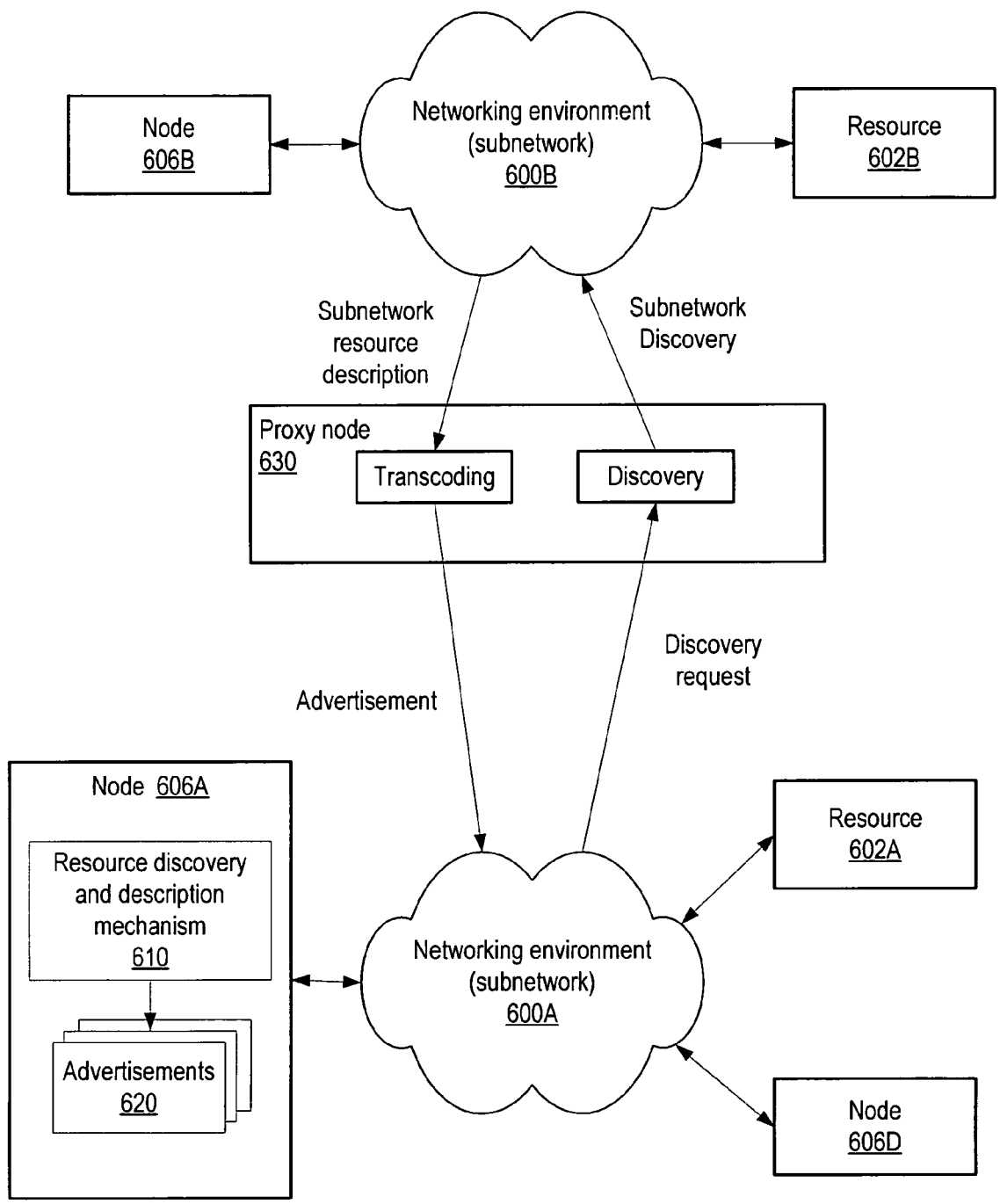
FIGS. 5A and 5B illustrate operations of a proxy node between subnetworks according to one embodiment.
Figure 5B:
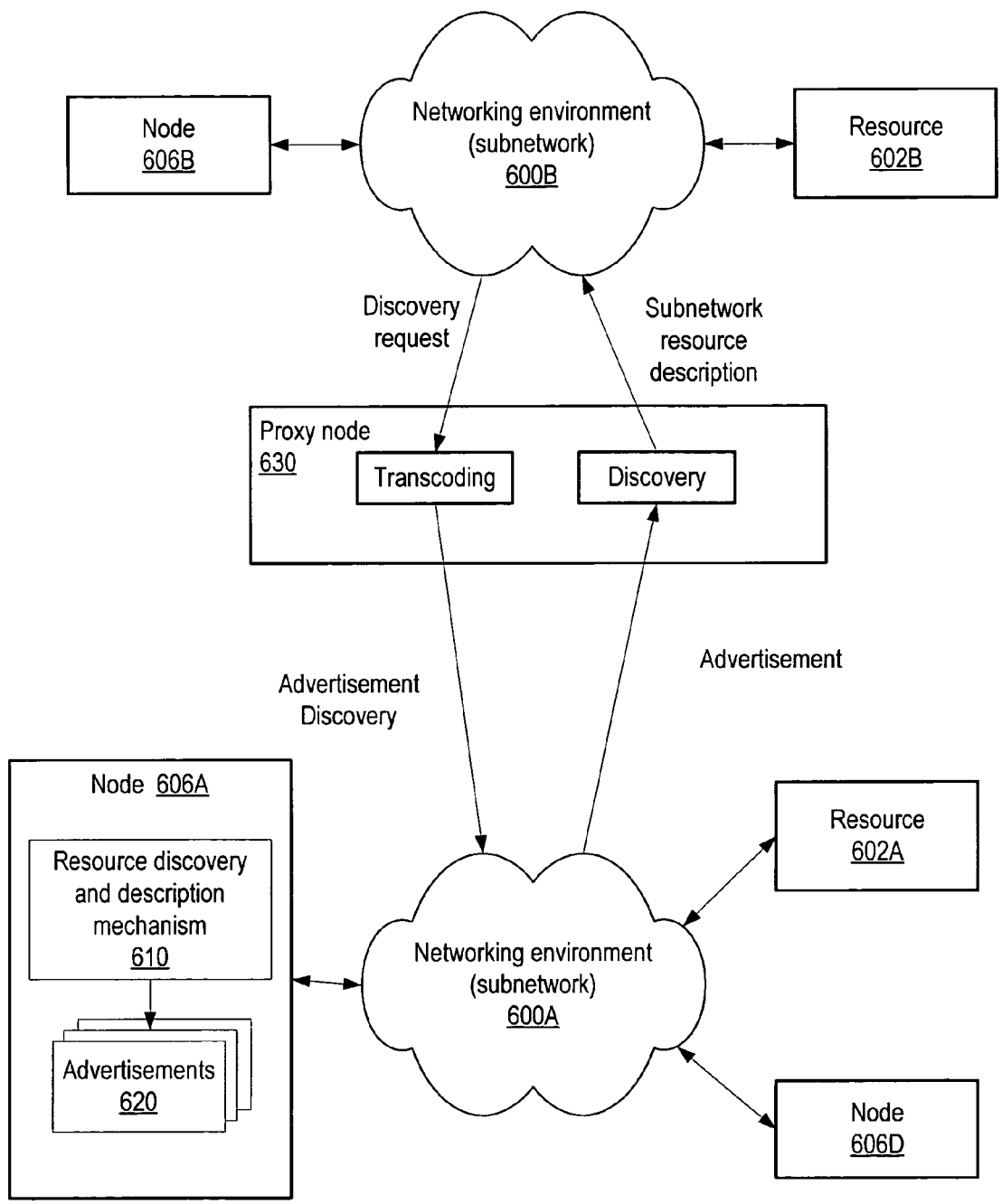

FIGS. 5A and 5B illustrate operations of a proxy node between subnetworks according to one embodiment. In this example, proxy node 630 is configured to serve as a proxy between networking environments 600A and 600B. In FIG. 5A, proxy node 630 may receive a discovery request from resource discovery and description mechanism 610 in networking environment 600A and perform the requested discovery within its subnetwork (networking environment 600B) according to the device and service description and discovery protocol used in the subnetwork. One or more resource descriptions formatted according to the device and service description format used by the device and service description and discovery protocol in networking environment 600B may be received in response to the subnetwork discovery. Proxy node 630 may then transcode these descriptions into the advertisement format described herein. If necessary, a UUID may be generated for a discovered resource.

In FIG. 5B, proxy node 630 may receive a discovery request from within its subnetwork 600B according to the device and service description and discovery protocol of the subnetwork. Proxy node 630 may then use the information in the discovery request to discover one or more advertisements 620 on networking environment 600A for one or more resources 602 specified by the discovery request(s). Proxy node 630 may then transcode the discovered advertisement(s) into resource description(s) formatted according to the device and service description format used by the device and service description and discovery protocol in networking environment 600B.

Referring to FIG. 4, a node 606 on a subnetwork that discovers an advertisement 620 for a resource 602 may then use the information in that advertisement 620 to connect to and communicate with the resource 602 it describes, through a physical endpoint if one is accessible to the node 606 or, alternatively, through a virtual endpoint if one is described in the advertisement 620. Note that, if the node 606 is on a subnetwork that uses a different device and service description format within the subnetwork, the advertisement 620 may be transcoded into that format when provided to the node 606.

Figure 6:
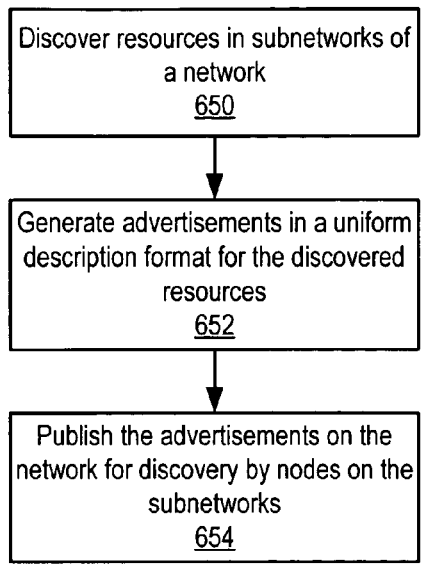
FIG. 6 is a flowchart illustrating a method for decentralized device and service description and discovery in networking environments according to one embodiment.

FIG. 6 is a flowchart illustrating a method for decentralized device and service description and discovery in networking environments according to one embodiment. A network may include a plurality of subnetworks. Each subnetwork may include one or more nodes and one or more resources (devices and/or services). Two or more of the subnetworks may implement different resource description and discovery protocols within the subnetworks. Each resource description and discovery protocol may be configured to generate resource descriptions in a format specific to that resource description and discovery protocol.

One or more nodes on the network may implement a resource discovery and description mechanism. As indicated at 650, the resource discovery and description mechanism may discover one or more of the resources on the subnetworks of a network.

As indicated at 652, the resource discovery and description mechanism may generate advertisements in a uniform description format for the discovered resources. The advertisements may be markup language documents. In one embodiment, the markup language is XML. Each advertisement may include information describing an associated resource. In one embodiment, each advertisement includes a universal unique identifier (UUID) that uniquely identifies the associated resource on the network. If a discovered resource provides a UUID, the resource discovery and description mechanism may use the provided UUID in the generated advertisement for the resource. If the discovered resource does not provide a UUID, the resource discovery and description mechanism may generate a UUID for the resource. In one embodiment, each UUID may incorporate data specific to the associated resource, for example a serial number and/or a MAC address for the resource.

In one embodiment, each advertisement includes one or more physical interface endpoints and one or more virtual interface endpoints for accessing the resource described by the advertisement. In one embodiment, each advertisement includes physical location information (e.g., GPS information) for the resource described by the advertisement. In one embodiment, each advertisement includes metadata for the resource described by the advertisement. The metadata may include, but is not limited to, one or more of a resource name, a resource type, and a manufacturer. In one embodiment, the advertisements are user-extensible to include additional information about the resource described by the advertisement.

In one embodiment, to generate the advertisements in the uniform description format for the discovered resources, the resource discovery and description mechanism may, if necessary, transcode resource descriptions in formats specific to the different resource description and discovery protocols of the subnetwork(s) including the resources into the uniform description format.

As indicated at 654, the resource discovery and description mechanism may publish the advertisements on the network for discovery by the nodes on the subnetworks. Nodes on the subnetworks may then discover a published advertisement for a resource on one of the subnetworks using one or more characteristics of the resource included in the information describing the resource to query for the resource. After discovering an advertisement for a resource, a node may access the resource associated with the discovered advertisement according to the information describing the resource in the discovered advertisement. In one embodiment, a discovered advertisement may be transcoded by the resource discovery and description mechanism from the uniform description format into a format used by the resource description and discovery protocol of the subnetwork in which the node that discovered the advertisement resides. The node can then access the resource according to the resource description and discovery protocol of its subnetwork. To the node, the resource may appear to be a local resource within its subnetwork.

Figure 7:
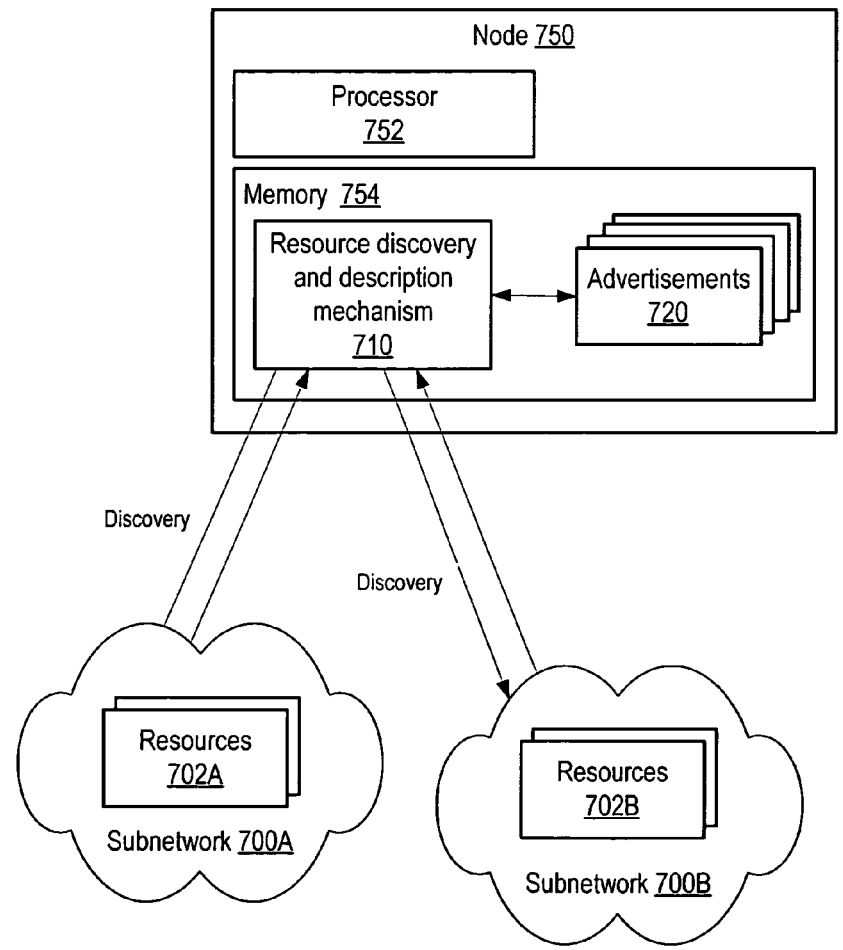
FIG. 7 illustrates a node hosting a resource discovery and description mechanism according to one embodiment.

FIG. 7 illustrates a node hosting a resource discovery and description mechanism according to one embodiment. Node 750 may be any of various types of devices, including, but not limited to, a personal computer system, desktop computer, laptop or notebook computer, mainframe computer system, workstation, network computer, Personal Digital Assistant (PDA), or other suitable device. In general, node 750 may be any device with a digital heartbeat. Node 750 may include at least one processor 752. The processor 752 may be coupled to a memory 754. Memory 754 is representative of various types of possible memory media, also referred to as "computer readable media" or "computer accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. Node 750 may couple over a network or networks to one or more other nodes or devices via one or more wired or wireless network interfaces.

Node 750 may include, in memory 754, an instance of a resource discovery mechanism 710. Resource discovery mechanism 710 may discover resources 702 in one or more networking environments or subnetworks 700 using resource description and discovery protocols of those subnetworks 700, and may obtain resource descriptions for the discovered resources formatted according to the resource description and discovery protocols of the subnetworks and describing the resources 702. The resource descriptions for the resources 702 may then be transcoded into advertisements 720 as described herein, cached in memory 754 (or, alternatively, cached and/or stored in memory on some other node(s) or device(s)), and published on the network. The published advertisements 720 may be discovered by other nodes in any of the subnetworks on the network, which may then use the information in the discovered advertisements to access the associated resources on any of the subnetworks within the network. A discovered advertisement 720 may, if necessary, be transcoded into a resource description describing its associated resource and formatted according to the resource description and discovery protocol used in the subnetwork of the node that discovered the advertisement.

In one embodiment, a mechanism for device and service description, transformation (transcoding), discovery, and connectivity in peer-to-peer network computing environments, or DTDC mechanism, such as the exemplary DTDC mechanism described below, may use these advertisements for generic, decentralized device and service description and discovery within subnetworks implementing the DTDC mechanism and across other subnetworks utilizing other device/service description mechanisms, protocols and formats. Embodiments of the DTDC mechanism may provide mechanisms to query other device/service description subnetworks and to describe newly discovered devices and services within the DTDC subnetwork(s) using these markup language advertisements, which allows secure, cross-network discovery of resources.

Figure 8:
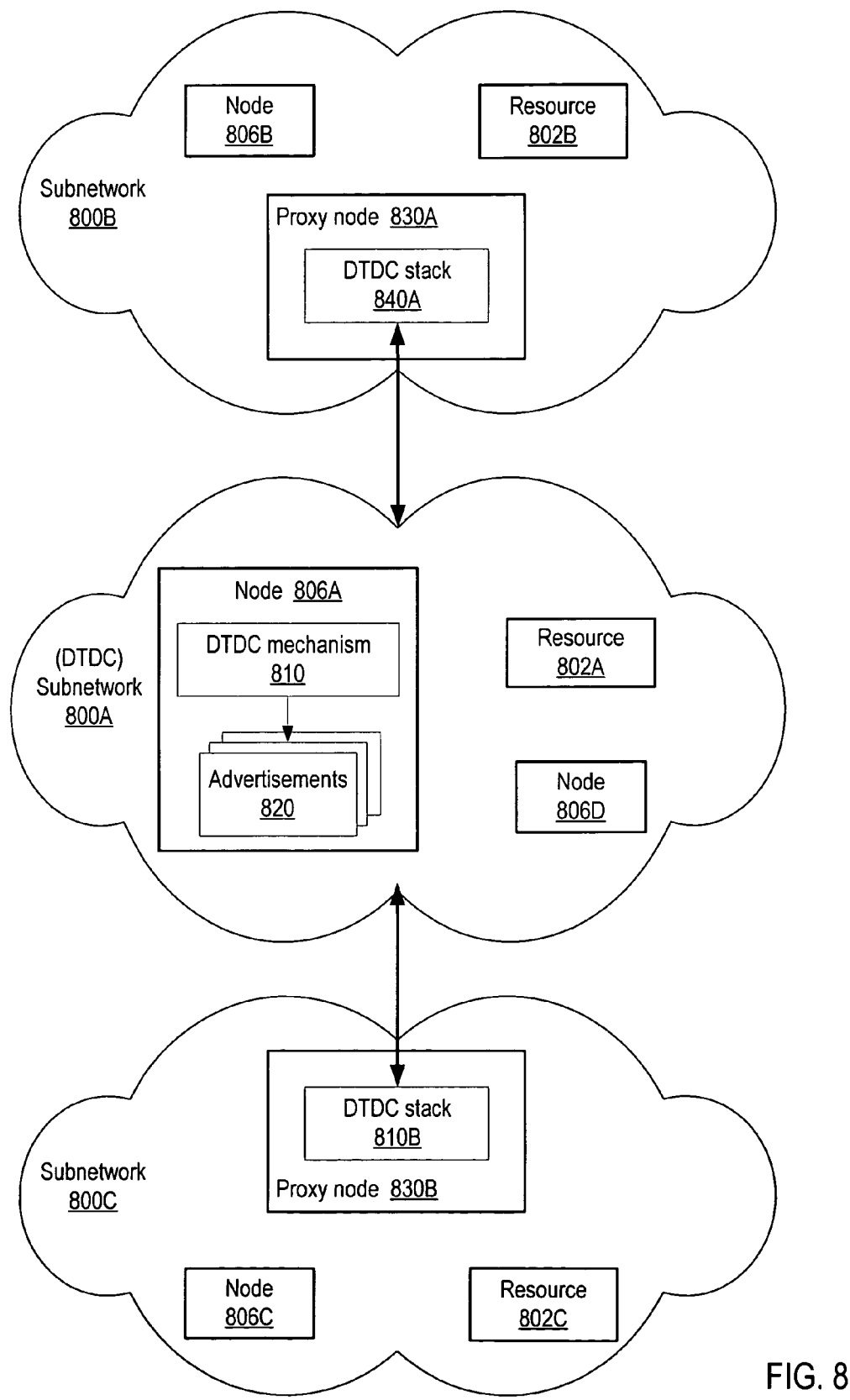
FIG. 8 illustrates an exemplary networking environment with subnetworks including a DTDC subnetwork utilizing cross-network advertisements according to one embodiment.

FIG. 8 illustrates an exemplary networking environment with subnetworks including a DTDC subnetwork utilizing cross-network advertisements according to one embodiment. In one embodiment, a subnetwork 800A implementing an embodiment of the DTDC mechanism may interface with other subnetworks (subnetworks 800B and 800C, in this example) that support other resource description and discovery protocols such as JINI, Apple Rendezvous, SLP, UPnP, DNS, and MDNS and, where applicable, take resource descriptions formatted according to the protocols of those subnetworks and generate universal representations of those resources as markup language (e.g., XML) documents (advertisements 820). These advertisements 820 may be cached within the DTDC subnetwork 800A and published, and are discoverable by nodes and resources in any of the subnetworks 800 on the network. An advertisement 820 discovered by a node or other resource on one of the subnetworks may then be used to access the advertised resource via a physical or, alternatively, virtual endpoint provided in the advertisement.

An advertisement 820 for a resource may include a UUID for that resource. This UUID uniquely identifies the resource within the network, and across all subnetworks of the network. If the DTDC mechanism is unable to obtain or determine a UUID for a resource, the DTDC mechanism generates and assigns a UUID to the resource. This UUID may include device-specific information, such as a serial number or MAC address.

Advertisements 820 may be transcoded to and from resource description formats specific to the subnetworks 800. For example, resource 802C in subnetwork 800C may be discovered, and a resource description formatted according to a resource description and discovery protocol specific to subnetwork 800C may be transcoded into an advertisement 820 for the resource 802C, which is cached on node 806A of DTDC subnetwork 800A. Node 806B may then discover the advertisement 820 for resource 802C. The discovered advertisement 820 may then be transcoded into a resource description formatted according to a resource description and discovery protocol specific to subnetwork 800B. Node 806B may then access resource 802C using the information provided in the resource description. To node 806B, resource 802C may appear to be located within its subnetwork 800B.

In one embodiment, there may be at least one node in each subnetwork 800 that is not a DTDC subnetwork that is configured to serve as a proxy node 830 for other nodes and resources within its subnetwork, for example proxy node 830A in subnetwork 800B and proxy node 830B in subnetwork 800C. A proxy node 830 may include a DTDC stack 840 that allows it to serve as a proxy between its subnetwork 800 and the DTDC subnetwork 800A. In one embodiment, a proxy node 830 may be configured to perform discovery of resources within its local subnetwork 800 using the subnetwork's resource description and discovery protocol, and for transcoding resource descriptions formatted according to the local resource description and discovery protocol into advertisements 820. The proxy node 830 may also be configured to translate discovery requests issued by other nodes or resources within its local subnetwork 800 into discovery requests for advertisements on the DTDC subnetwork 800A, and for transcoding advertisements 820 provided in response to those discovery requests into resource descriptions formatted according to the local resource description and discovery protocol.

At least some nodes and resources on the subnetworks of a network may be configured to directly interpret the format of the markup language advertisements as described herein. These nodes and resources may bind to a particular advertised resource either through its physical or virtual addresses as provided in the advertisement for the resource. For nodes or resources not configured to interpret the advertisements, the DTDC mechanism may expose an actual physical socket using tunnel sockets (described below) which bind to the virtual addresses that are defined in the device or service advertisement, and the device or service would appear as a local device or service. The printing services in the Macintosh OS, for example, have their own protocol (e.g., Multicast DNS). The DTDC mechanism may expose the markup language advertisements in multicast DNS format so that DNS queries can be issued on the advertisements without having to know anything about the DTDC mechanism or the universal device and service description used in the advertisements.

DTDC Mechanism

Embodiments of a mechanism for device and service description, transformation (transcoding), discovery, and connectivity in peer-to-peer network computing environments, or DTDC mechanism, may provide a uniform device and service description and interface, while recognizing slow adoption of new protocols. The DTDC mechanism may provide tools and/or mechanisms to facilitate interface proxying of devices and/or services, including legacy devices and services, in a network computing environment. The DTDC mechanism may enable application developers and end users to define workspaces which best suit their needs, without the need for network administration, regardless of location or network topology. The DTDC mechanism may unify device and service description, discovery, and connectivity. The DTDC mechanism may provide tools and/or mechanisms that enable application developers and other users to design and implement virtual networks consisting of services and/or devices (regardless of location, platform, protocols, etc.) that best suit their needs.

One embodiment of the DTDC mechanism may be implemented on top of JXTA™ as a foundational peer-to-peer platform. Other embodiments may be implemented on other peer-to-peer platforms. The underlying peer-to-peer platform may provide one or more underlying tools, formats, protocols, and/or mechanisms, such as communication channels (or pipes) and basic advertisement formats, that may be leveraged by the DTDC mechanism to provide device and service description, transformation, discovery, and connectivity in peer-to-peer network computing environments.

Embodiments of the DTDC mechanism may be used as a foundation to implement a tunneling mechanism, which may provide tunnel sockets between network environments that allow a system in one environment to interconnect with devices and/or services (which may collectively be referred to as resources) in other environments. A tunnel socket is a proxy or bridge across a peer-to-peer protocol network (e.g. a JXTA network) between different environments. On the tunnel socket, descriptions of devices or services in one format (e.g. SLP) may be translated to the uniform device and service description format, where they may be discovered and translated into other formats in other environments (e.g. MDNS) for access by entities in the other environment.

Embodiments of the DTDC mechanism may provide mechanisms for bridging or proxying between different platforms and protocols. Using the DTDC mechanism, regardless of the devices or platforms on which services are running (e.g. Sun Solaris, Linux, Macintosh OS X a.k.a. Mac OsX, etc.) or discovery protocol (e.g. MDNS, SLP, Jini, UPnP, etc) that devices support, devices and services are transparently able to interconnect and interact in a peer-to-peer networking environment.

Embodiments of the DTDC mechanism may provide generic mechanisms for describing, advertising, and discovering devices and/or services in a peer-to-peer network computing environment. The DTDC mechanism may allow devices and/or services to be described, advertised, and discovered using physical and/or logical (virtual) addresses. The DTDC mechanism may be used to describe, advertise, and discover devices (e.g. printers, disk drives, or any other networkable device) and/or services in terms of their capabilities; to discover, describe and advertise location (e.g. GPS location information) for the devices and/or services; and may allow the devices and/or services to participate in a peer-to-peer network computing environment using physical and/or virtual addresses regardless of the devices' or services' underlying platforms, supported protocols, and/or locations.

In one embodiment of the DTDC mechanism, description, discovery, and advertisement of devices and/or services may be implemented using an underlying peer-to-peer platform such as the JXTA peer-to-peer platform, and the DTDC mechanism may provide mechanisms for interconnecting heterogeneous devices and/or services across the peer-to-peer platform computing environment. The DTDC mechanism may provide a standard way to describe, advertise and discover devices and/or services in a peer-to-peer computing environment not provided by the underlying peer-to-peer platform. The DTDC mechanism may allow devices and/or services in one environment (e.g. operating platform such as Solaris, protocols such as SLP and MDNS, etc.) to be exposed in other environments using different platforms and protocols. For example, a printer in a Solaris environment may be exposed to other systems in other environments, for example a Macintosh OS X (Mac OsX) environment, and accessed from the other system as if the printer was a device in that environment.

Figures 9, 10:
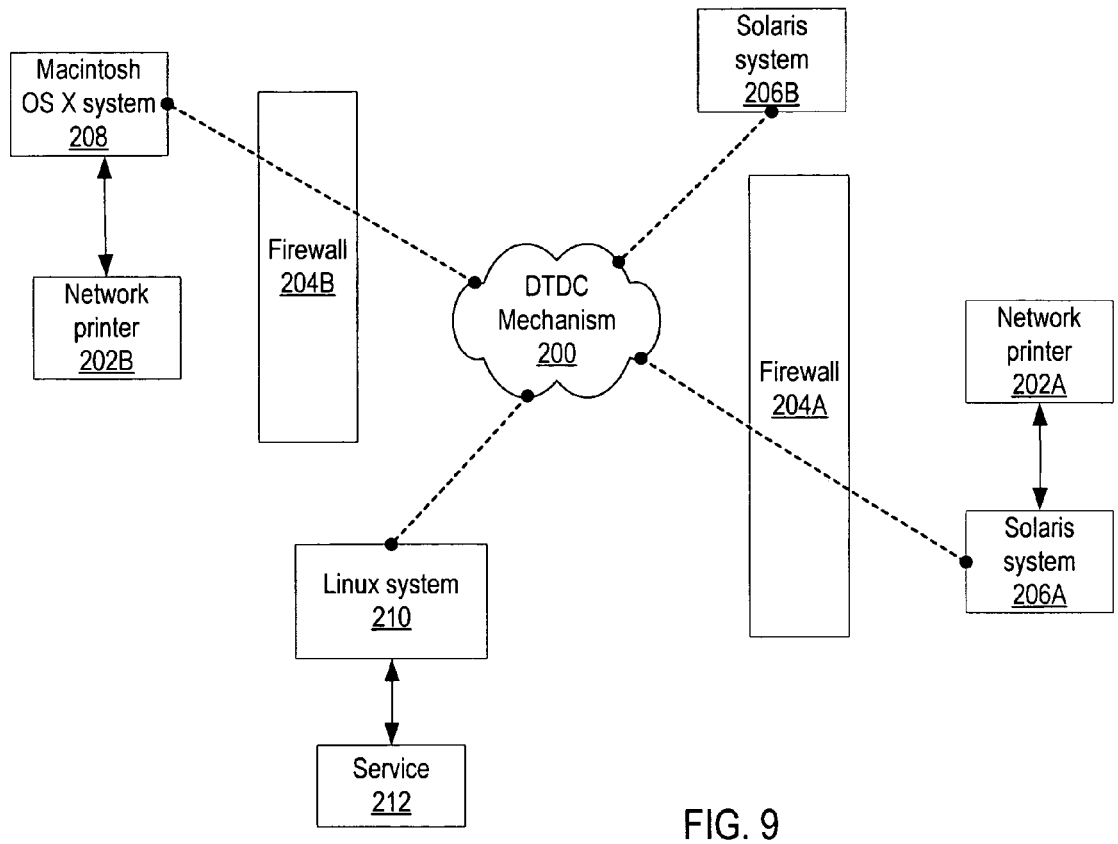
FIG. 9 illustrates an exemplary implementation of an embodiment of mechanism(s) for device and service description, transformation (transcoding), discovery, and connectivity (DTDC mechanism) in a peer-to-peer networking environment.
FIG. 10 illustrates an exemplary printer advertisement according to one embodiment.

FIG. 9 illustrates an exemplary implementation of an embodiment of the DTDC mechanism in a peer-to-peer networking environment. In FIG. 9, Solaris systems 206A and 206B may be peer nodes in Solaris networking environments, Macintosh OS X system 208 may be a peer node in a Macintosh OS X networking environment, and Linux system 210 may be a peer node in a Linux networking environment. As peer nodes, the systems may participate as peers in a peer-to-peer networking environment on a network. One or more of the systems may operate behind firewalls. In this example, Macintosh OS X system 208 operates behind firewall 204B, and Solaris system 206A operates behind firewall 204A. One or more of the systems may be coupled to devices and/or provide services in their networking environments. In this example, Solaris system 206A is coupled to network printer 202A in its networking environment, Macintosh OS X system 208 is coupled to network printer 202B in its networking environment, and Linux system 210 provides a service 212 in its networking environment. Note that the devices and/or services may be "legacy" devices or services that are not part of the peer-to-peer network.

The DTDC mechanism 200 may enable application developers and other users to design and implement virtual networks consisting of services and/or devices (regardless of location, platform, protocols, networking environment, etc.) that best suit their needs. Devices and/or services may be discovered in one networking environment using a protocol of the environment, e.g. SLP in a Solaris environment and advertised in a uniform description format of the DTDC mechanism. The advertisement may be discovered, and the advertised device or service may be accessed, from another networking environment, e.g. from a Macintosh OS X or Linux environment. In the other networking environment (e.g., Macintosh OS X), the devices and/or services may appear as if they are entities in the local networking environment. The DTDC mechanism 200 may provide this access across one or more firewalls, if necessary.

For example, using DTDC mechanism 200, a legacy network printer 202A in a Solaris environment may be discovered by Solaris system 206A, for example using SLP. A device description for the printer 202A in the format of the protocol (e.g., SLP) may be transcoded into a description or advertisement in a uniform description format of the DTDC mechanism, such as a JXTA advertisement. The advertisement may include one or more of, but is not limited to, location information for the device or service (e.g. GPS information such as latitude, longitude, and altitude), a unique identifier for the device or service, name and type of the device or service, pipe information for accessing the device or service, description(s) of capabilities of the device or service, (e.g. printing capabilities for a printer, capacity and other capabilities for a disk drive, functionality of a service, etc.), etc. The advertisement in the uniform description format may be published on the peer-to-peer networking environment for discovery by other entities, potentially in other networking environments, that may or may not support the protocol of the device or service (e.g. SLP, in this example).

As an example, Macintosh OS X system 208 may discover the published advertisement in the uniform description format for network printer 202A in the Solaris environment. The advertisement in the uniform description format may be translated (transcoded) into a device or service description format used by Macintosh OS X system 208 in the Macintosh OS X environment, e.g. MDNS (also referred to as the Apple Rendezvous Protocol). Macintosh OS X system 208 may then access network printer 202A according to the protocol of its networking environment (MDNS). To Macintosh OS X system 208, it appears that printer 202A is being accessed according to the protocol of its local networking environment, when in effect the DTDC mechanism 200 is transparently proxying the device or service for the entity.

In heterogeneous environments, devices and services may be described and advertised in a variety of ways. In addition, many systems in such environments may lack a unified discovery mechanism and/or the ability to uniquely identify such devices and services. For device and service advertisement and discovery, embodiments of DTDC mechanism 200 may address these deficiencies by providing one or more mechanisms that facilitate one or more of, but not limited to:

Discovery of devices and services (over one or more protocols)

Local caching, e.g. of service and/or device descriptions (advertisements)

Assigning Unique Identifiers to devices and/or services

Transformation from one service and/or device description representation into a uniform representation (Service and Device advertisements)

Publication of advertisements within a user defined domain (e.g. a peer group of a peer-to-peer platform such as JXTA™)

Advertisement discovery

Locality, including, but no limited to, discovery and advertisement of location information (e.g. GPS information) for services and devices on a network Once a service or device is identified and described, it may be published and discovered, in one embodiment within a user defined domain (e.g. a peer group such as a JXTA™ Peer Group).

For device and service description in peer-to-peer network computing environments, DTDC mechanism 200 may define a set of device and/or service description mechanisms (which may be referred to herein as advertisements) that may provide detailed description(s) of their associated device and/or service. These advertisements may provide a rich representation of the associated devices and services, and may provide a uniform representation of services and/or devices to entities in a peer-to-peer network computing environment. These advertisements may include one or more of, but are not limited to, information such as global positioning information, unique identification (e.g., JXTA's unique identifiers (UUIDs)), and other metadata. Advertisements may also include local interface information and/or virtual interface information. Advertisements may be advertised and made available within the peer-to-peer network computing environment, such as a JXTA™ network. Advertisements may provide the application developer flexibility and extensibility in device and service description. In embodiments of DTDC mechanism 200 based on JXTA, JXTA may provide definitions and implementations for basic advertisements that may be used by the DTDC mechanism 200. Advertisements may be markup language documents. In one embodiment, the markup language may be XML.

As an example, an advertisement may provide detailed information about a printer or other device including one or more of, but not limited to, type, location, capabilities, configuration, and local and/or virtual interface information for the device. FIG. 10 illustrates an exemplary printer advertisement according to one embodiment. In this example, the advertisement includes, but is not limited to, the printer's name, identifier (UUID), description, pipe identifier (a pipe is a communication channel), type, and location.

Figure 11:
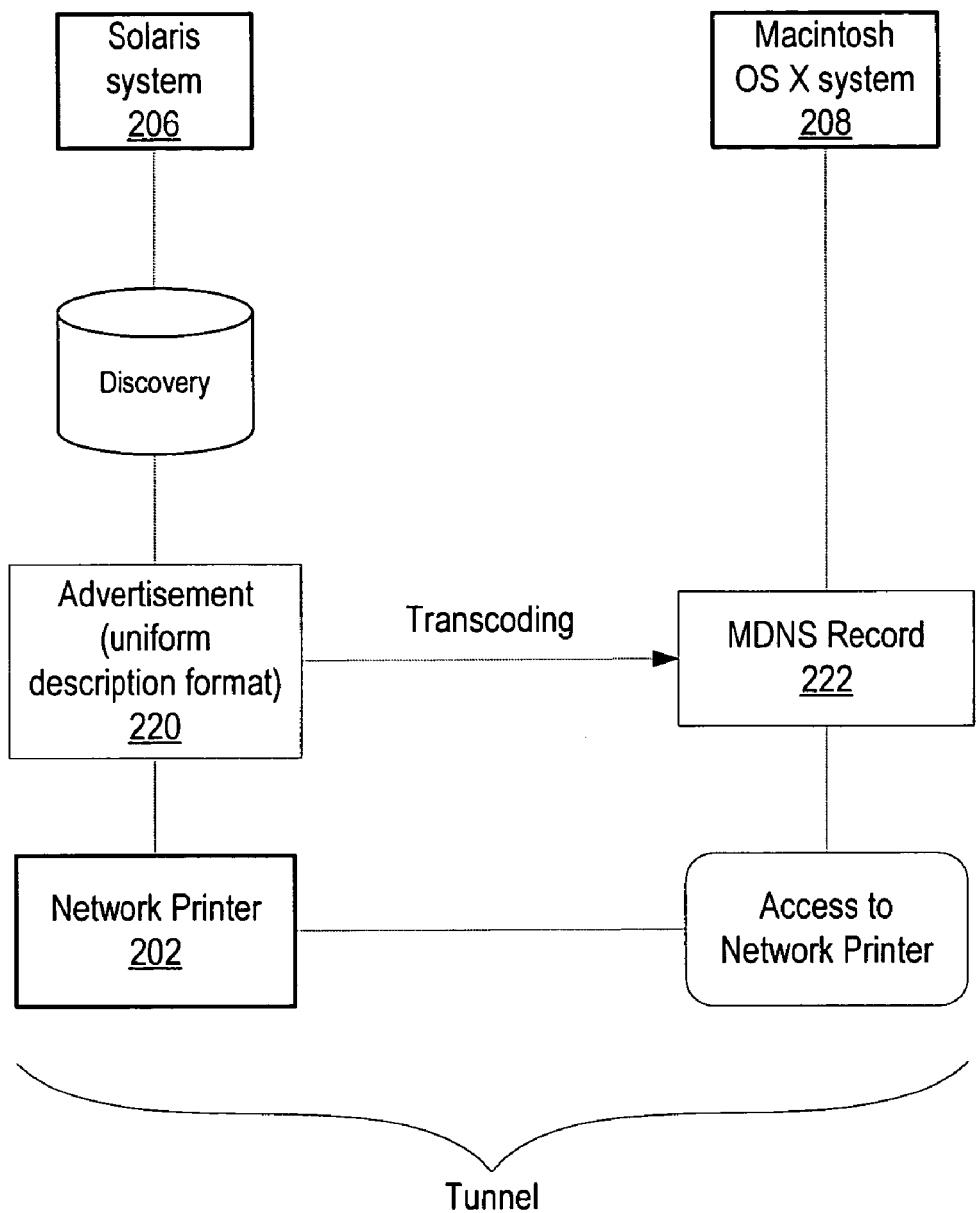
FIG. 11 illustrates transcoding a printer description between an MDNS record format and an exemplary advertisement format according to one embodiment.

FIG. 11 illustrates transcoding a printer description between an advertisement in a uniform description format used by the DTDC mechanism and an MDNS record format according to one embodiment. For description transcoding in peer-to-peer network computing environments, the DTDC mechanism may provide one or more mechanisms that transform a device or service description from other description systems to a uniform description format of the DTDC mechanism and vice versa. For example, a printer may be described as a Multicast Domain Name System (MDNS) record or using Service Location Protocol (SLP). Such devices can be discovered, for example using MDNS, and the device description may then be transcoded or translated into an advertisement in a uniform description format as described above, assigned a unique identifier, and advertised within the virtual network, e.g. a JXTA virtual network.

For device and/or service interconnection, the DTDC mechanism may provide one or more mechanisms to interconnect devices and services (which may collectively be referred to as resources) regardless of location or topology. The DTDC mechanism may recognize and provide mechanisms for interconnecting legacy devices and services. The DTDC mechanism may provide mechanisms to address the slow adoption of new protocols. The DTDC mechanism may provide a set of tools or mechanisms that provide interconnects to enable connectivity regardless of type of transport (e.g. TCP/IP, IrDA, RS-232, Bluetooth, etc.), or location (e.g. across domains) without the need of network administration. An example of such a tool or mechanism may be an embodiment of the tunneling mechanism that may be used to implement tunnel sockets that provide a reliable and secure end-to-end proxy of a device or service without any modification of protocols or loss of functionality.

Figure 12:
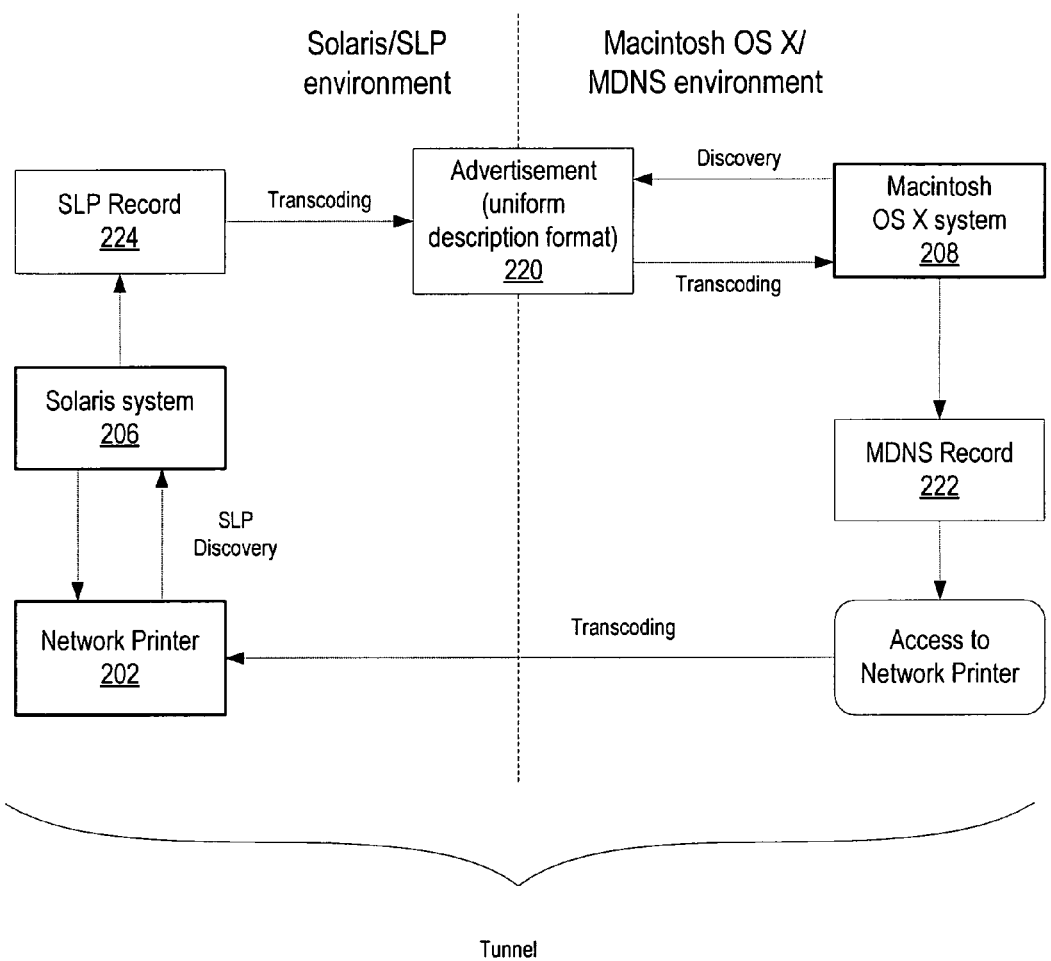
FIG. 12 illustrates a virtual network with an entity in one networking environment accessing a device or service in another networking environment according to one embodiment of the tunneling mechanism.

FIG. 12 illustrates a virtual network with an entity in one networking environment accessing a device or service in another networking environment according to one embodiment of the tunneling mechanism. The tunneling mechanism may provide tunnel sockets between networking environments that allow a system in one environment to interconnect with resources (e.g., devices and/or services) in other environments. In one embodiment, a DTDC mechanism such as that described above may be used as a foundation to implement the tunneling mechanism.

Macintosh OS X system 208 and Solaris system 206 may also be referred to as "nodes" on the network. In one embodiment, Macintosh OS X system 208 and Solaris system 206 may be peer nodes in a peer-to-peer networking environment on the network. In one embodiment, the systems (Solaris system 206 and Macintosh OS system 208) may be peer nodes in a peer-to-peer networking environment that is a "virtual" network across two or more networking environments on the network. For example, Solaris systems 206 may be a peer node in a Solaris/SLP networking environment, and Macintosh OS X system 208 may be a peer node in a Macintosh OS X/MDNS networking environment. The peer-to-peer networking environment may be implemented according to a peer-to-peer platform. In one embodiment, the peer-to-peer platform may be JXTA. Other embodiments may use other peer-to-peer platforms.

Solaris system 206 may discover a network printer 202 in the Solaris/SLP environment using SLP, generating an SLP record 224 describing the printer 202. SLP record 224 may then be transcoded into an advertisement 220 in a uniform description format (e.g., a JXTA advertisement) and published on the network. The published advertisement 220 may be discovered by other entities in other networking environments on the network, for example Macintosh OS X system 208 in a Macintosh OS X/MDNS environment. The discovered advertisement 220 may then be transcoded into an MDNS record 222 describing the printer 202 which may be used by Macintosh OS X system 208 to access network printer 202 in the Solaris/SLP environment. In one embodiment, the tunneling mechanism may provide transparent transcoding of command messages issued by Macintosh OS X system 208 for network printer 202 and for response messages from network printer 202 to Macintosh OS X system 208. To Macintosh OS X system 208, it appears that network printer 202 is being accessed according to the system's local network environment protocol (MDNS), when in effect the tunneling mechanism is transparently proxying the network printer 202 for Macintosh OS X system 208 via the tunnel socket established using the tunneling mechanism.

Note that FIG. 12 illustrates the tunneling mechanism used for accessing a device, specifically a printer, in a different networking environment. The tunneling mechanism may also be used for accessing other types of devices than printers, as well as for accessing services. Therefore, in this example, any other type of network-accessible resource (e.g., device and/or service) in one networking environment may be accessed using the tunneling mechanism from another networking environment. Also note that, while this example shows a device in a Solaris/SLP environment being accessed by an entity in a Macintosh OS X/MDNS environment, the tunneling mechanism may be used for accessing resources in or from other networking environments than these exemplary environments.

Figure 13:
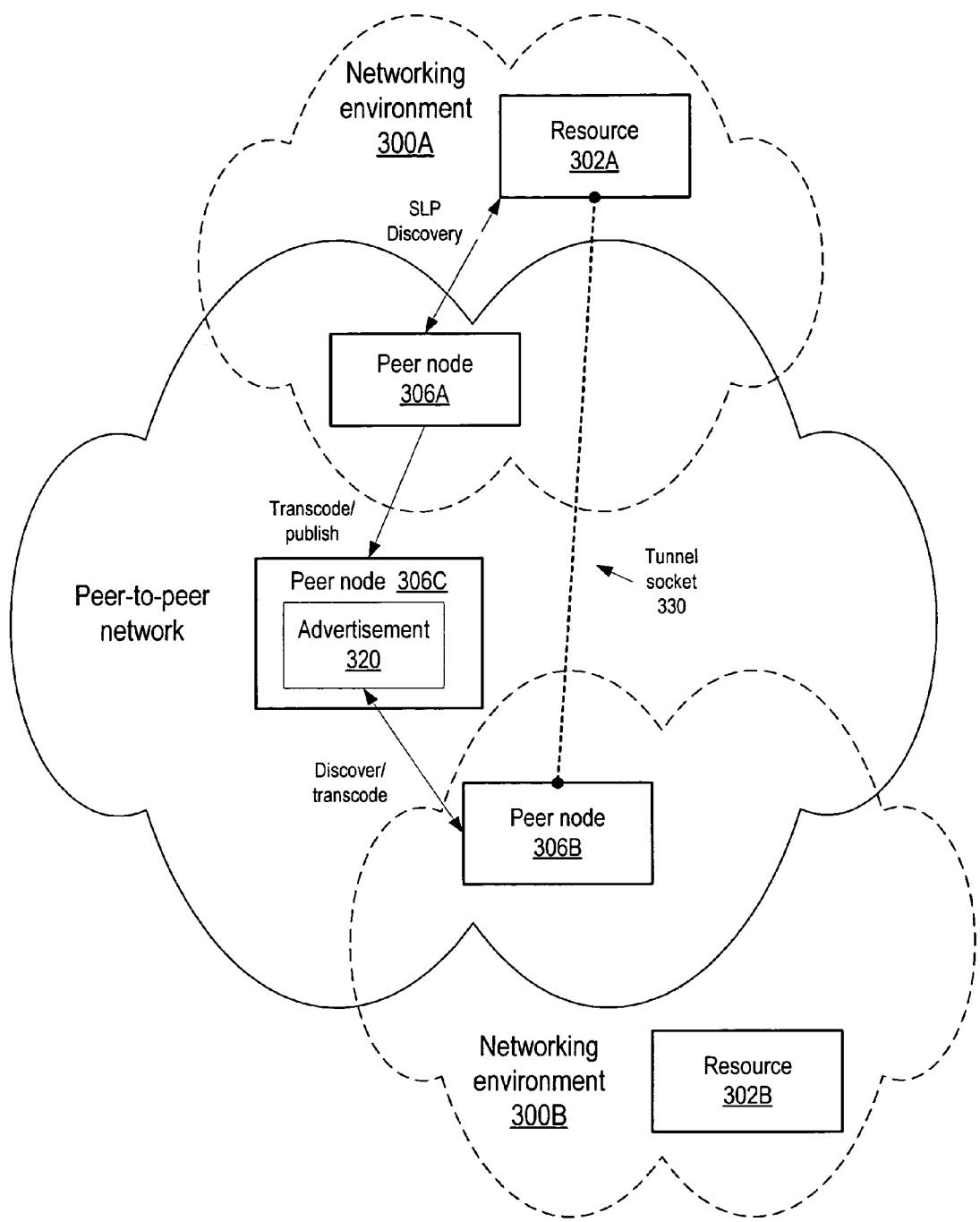
FIG. 13 illustrates a peer-to-peer network with a peer node in one networking environment accessing a resource in another networking environment according to one embodiment of the tunneling mechanism.

FIG. 13 illustrates a peer-to-peer network with a peer node in one networking environment accessing a resource (e.g., a device or service) in another networking environment according to one embodiment of the tunneling mechanism. A peer-to-peer network may include two or more peer nodes, in this example peer nodes 306A, 306B, and 306C. In one embodiment, each peer node 306 may include an instance of code to implement a tunneling mechanism as described herein.

Peer node 306A may discover a resource 302A in networking environment 300A using a protocol of that networking environment, and may obtain or generate a record for the resource 302A formatted according to the protocol and describing the resource 302A. The record for resource 302A may then be transcoded into an advertisement 320 in a uniform description format (e.g., a JXTA advertisement) and published on the peer-to-peer network. In this example, the advertisement 320 has been published to peer node 306C. Note that the advertisement 320 may be published elsewhere in the peer-to-peer network, including on peer node 306A.

The published advertisement 320 may be discovered by other peer nodes in other networking environments on the peer-to-peer network, for example peer node 306B in networking environment 300B. The discovered advertisement 320 may then be transcoded into a record formatted according to a protocol of networking environment 300B and describing resource 302A, which may be used by peer node 306B to access resource 302A from networking environment 300B. Information in the record may be used to establish a multiplexed communication channel (tunnel socket 330) between peer node 306B and resource 302A and across networking environments.

In one embodiment, the tunneling mechanism may provide transparent transcoding of messages issued by peer node 306B for resource 302A and for messages from resource 302A to peer node 306B to translate the messages between networking environments. To peer node 306B, it appears that resource 302A is being accessed according to the peer node's local network environment protocol, when in effect the tunneling mechanism is transparently proxying the resource 302A for peer node 306B via the tunnel socket 330 established using the tunneling mechanism.

Note that networking environment 300B may include a resource 302B. Peer node 306B may discover resource 302B, obtain a record formatted according to a protocol of networking environment 300B, transcode the record to generate an advertisement in the uniform description formation, and publish the advertisement on the peer-to-peer network as was described for resource 302A and peer node 306A above. Peer node 306A may then discover the advertisement for resource 302B, which may then be transcoded into a record formatted according to a protocol of networking environment 300A. Peer node 306A may then access resource 302B using the record as was described for peer node 306B and resource 302A.

Figure 14A:
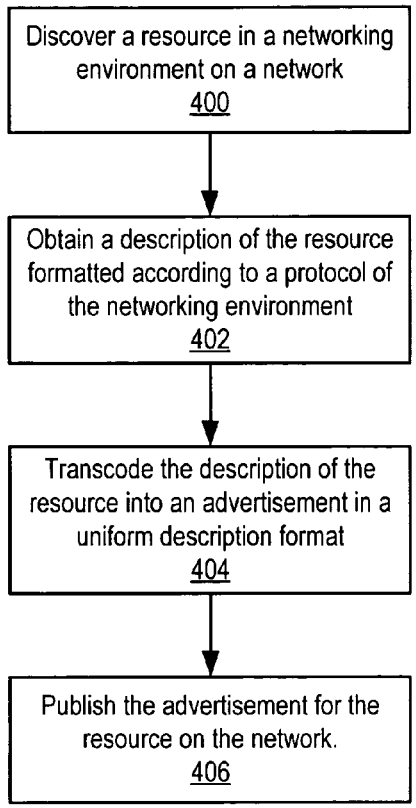
FIG. 14A is a flowchart illustrating a method of discovering and advertising network resources according to one embodiment of the tunneling mechanism.
Figure 14B:
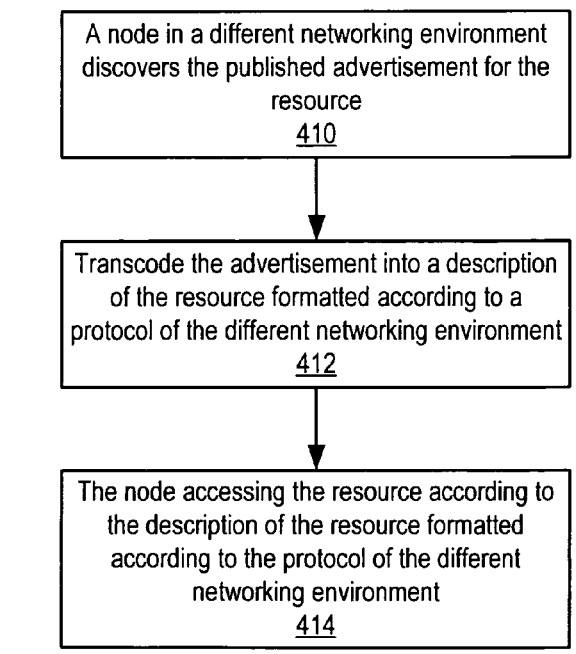
FIG. 14B illustrates a node on a network operating in a different networking environment than an advertised resource discovering a published advertisement for the resource and accessing the resource according to one embodiment of the tunneling mechanism.

FIGS. 14A and 14B are flowcharts illustrating the operation of a tunneling mechanism according to one embodiment. FIG. 14A is a flowchart illustrating a method of discovering and advertising network resources according to one embodiment of the tunneling mechanism. As indicated at 400, a node on the network may discover a resource in a networking environment on the network. In one embodiment, the node may be a peer node in a peer-to-peer networking environment on the network. The peer-to-peer networking environment may be implemented according to a peer-to-peer platform. In one embodiment, the peer-to-peer platform may be JXTA. The discovered resource may be one of, but not limited to, a device in the networking environment or a service implemented on another node in the networking environment.

As indicated at 402, the node may obtain or generate a description of the resource formatted according to a protocol of the networking environment. As indicated at 404, the description of the resource may then be transcoded to generate an advertisement in a uniform description format. The advertisement may include metadata describing the resource. The metadata may include one or more of, but is not limited to, global positioning information, a unique identifier, a name, a description, a type, and a pipe identifier for the resource.

As indicated at 406, the advertisement for the resource may then be published on the network. In one embodiment, the advertisement may be published within a user-defined domain in a peer-to-peer networking environment on the network. In one embodiment, the user-defined domain may be a peer group.

FIG. 14B illustrates a different node on the network operating in a different networking environment than an advertised resource discovering the published advertisement for the resource and accessing the resource according to one embodiment of the tunneling mechanism. In one embodiment, the different node may also be a peer node in the peer-to-peer networking environment on the network. The peer-to-peer networking environment may be implemented according to a peer-to-peer platform. In one embodiment, the peer-to-peer platform may be JXTA. In one embodiment, the networking environment that the resource is in and the different networking environment that the different node is in may differ in one or more of underlying platforms and protocols supported by network resources in the networking environments.

As indicated at 410, the node in the different networking environment may discover the published advertisement for the resource on the network. As indicated at 412, the advertisement may then be transcoded from the uniform description format into a description of the resource formatted according to a protocol of the different networking environment. As indicated at 414, the node in the different networking environment may then access the resource using the description of the resource formatted according to the protocol of the different networking environment. To the node accessing the resource, the resource appears as a resource in the different networking environment.

Figure 15:
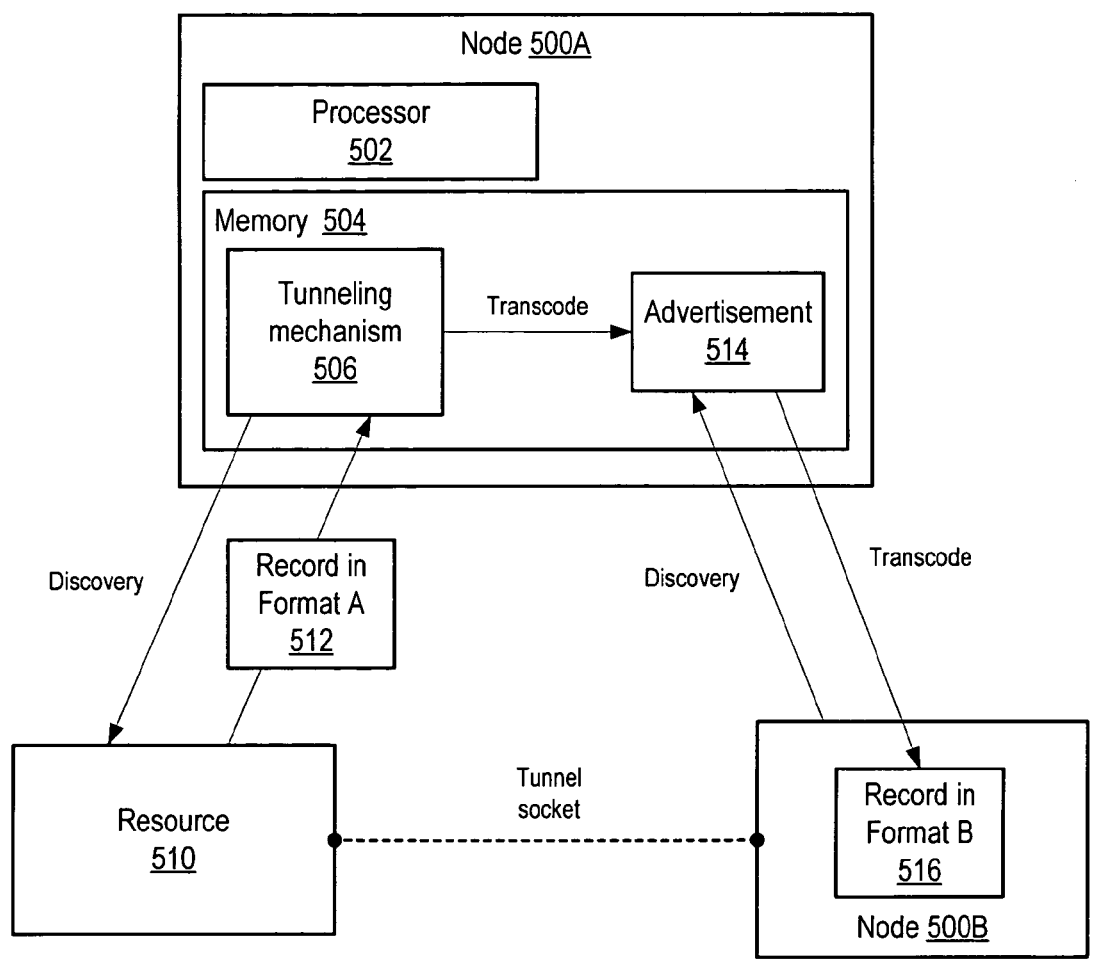
FIG. 15 illustrates a node hosting a tunneling mechanism according to one embodiment.

FIG. 15 illustrates a node hosting a tunneling mechanism according to one embodiment. Node 500A may be any of various types of devices, including, but not limited to, a personal computer system, desktop computer, laptop or notebook computer, mainframe computer system, workstation, network computer, Personal Digital Assistant (PDA), or other suitable device. In general, node 500A may be any device with a digital heartbeat. Node 500A may include at least one processor 502. The processor 502 may be coupled to a memory 504. Memory 504 is representative of various types of possible memory media, also referred to as "computer readable media" or "computer accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. Node 500A may couple over a network or networks to one or more other devices via one or more wired or wireless network interfaces.

Node 500A may include, in memory 504, an instance of a tunneling mechanism 506. Node 500A may discover a resource 510 in a first networking environment using a protocol of that networking environment, and may obtain or generate a record 512 for the resource 510 formatted according to the protocol and describing the resource 510. The record 512 for resource 510 may then be transcoded into an advertisement 514 in a uniform description format (e.g., a JXTA advertisement) and published on the network. Note that the advertisement 514 may be published to other nodes on the network.

The published advertisement 514 may be discovered by other nodes in other networking environments on the network, for example node 500B. The discovered advertisement 514 may then be transcoded into a record 516 describing resource 510 and formatted according to a protocol used in the networking environment of node 500B, which may be the be used by node 500B to access resource 510 from its networking environment. Information in the record may be used to establish a multiplexed communication channel, or tunnel socket, between node 500B and resource 510 and across networking environments.

Note that node 500B may be a device with an architecture similar to the description of node 500A, with at least one processor and a memory similar to those described for node 500A. Node 500B may also include an instance of tunneling mechanism 506 in memory, similar to node 500A. Also note that the systems and nodes described in FIGS. 9, 11, 12 and 13 may each have a similar architecture as that described for node 500A of FIG. 15, and may each include an instance of the tunneling mechanism in memory.

In one embodiment, the tunneling mechanism may provide transparent transcoding of messages issued by node 500B for resource 510 and for messages from resource 510 to node 500B to translate the messages between networking environments. To node 500B, it appears that resource 510 is being accessed according to the node's local network environment protocol, when in effect the tunneling mechanism is transparently proxying the resource 510 for node 500B via the tunnel socket established using the tunneling mechanism.

Peer-to-Peer Platform Implementation

Sun Microsystems's JXTA™ is an exemplary peer-to-peer platform that provides a virtual network overlay on top of the Internet, allowing peers to directly interact and self-organize independently of their network connectivity and domain topology (e.g. firewalls and/or NATs). As previously mentioned, some embodiments of the DTDC mechanism and/or resource discovery and description mechanism may be implemented on top of JXTA™ as a foundational peer-to-peer platform. Other embodiments may be implemented on other peer-to-peer platforms. The underlying peer-to-peer platform may provide one or more underlying tools, formats, protocols, and/or mechanisms, such as pipes and basic advertisement formats, that may be leveraged to provide device and service description, transformation, discovery, and connectivity in peer-to-peer network computing environments.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A network computing system, comprising:
a network comprising a plurality of subnetworks, each subnetwork comprising multiple nodes and one or more resources, wherein two or more of the subnetworks implement different resource description and discovery protocols within the subnetworks, wherein each resource description and discovery protocol is configured to generate resource descriptions in a format specific to that resource description and discovery protocol;
a node on one of the subnetworks, configured to:
discover one or more of the resources on the subnetworks;
generate advertisements in a uniform description format for the discovered resources, wherein each advertisement includes information describing an associated resource, wherein to generate advertisements in a uniform description format for the discovered resources, the node on one of the subnetworks is configured to translate resource descriptions in formats specific to the different resource description and discovery protocols into the uniform description format; and
publish the advertisements in the uniform description format on the network for discovery by the nodes on the subnetworks, wherein the nodes are each configured to read resource descriptions in the uniform description format from discovered advertisements;
wherein each advertisement comprises a universal unique identifier that uniquely identifies the associated resource on the network, and further wherein, to generate advertisements in a uniform description format for the discovered resources, the node on one of the subnetworks is configured to: if a discovered resource provides a universal unique identifier, use the provided universal unique identifier in the generated advertisement for the resource; if the discovered resource does not provide a universal unique identifier, generate a universal unique identifier for the resource.

2. The network computing system as recited in claim 1, wherein each advertisement identifies one or more physical interface endpoints and one or more virtual interface endpoints for accessing a resource described by the advertisement.

3. The network computing system as recited in claim 1, wherein each advertisement includes physical location information for a resource described by the advertisement.

4. The network computing system as recited in claim 1, wherein each advertisement includes metadata for a resource described by the advertisement, wherein the metadata includes one or more of a resource name and a resource type.

5. The network computing system as recited in claim 1, wherein the advertisements are user-extensible to include additional information about a resource described by the advertisement.

6. The network computing system as recited in claim 1, wherein the resources include devices and services.

7. The network computing system as recited in claim 1, wherein one or more of the nodes are peer nodes in a peer-to-peer networking environment implemented according to a peer-to-peer platform on the network.

8. The network computing system as recited in claim 7, wherein the peer-to-peer platform is JXTA.

9. The network computing system as recited in claim 1, wherein each universal unique identifier incorporates data specific to the associated resource.

10. The network computing system as recited in claim 9, wherein the data specific to the associated resource includes one or more of a serial number for the resource and a MAC address for the resource.

11. The network computing system as recited in claim 1, wherein each of the nodes on the subnetworks is configured to:

discover a published advertisement for a resource on one of the subnetworks using one or more characteristics of the resource included in the information describing the resource; and access the resource associated with the discovered advertisement according to the information describing the resource in the discovered advertisement.

12. The network computing system as recited in claim 1, wherein the advertisements are markup language documents.

13. The network computing system as recited in claim 12, wherein the markup language is XML.

14. A system, comprising:
   a processor; and
   a memory comprising program instructions, wherein the program instructions are executable by the processor to implement a resource discovery and description mechanism configured to:
   discover resources on a plurality of subnetworks of a network, wherein each subnetwork comprises multiple nodes and one or more resources, wherein two or more of the subnetworks implement different resource description and discovery protocols within the subnetworks, wherein each resource description and discovery protocol is configured to generate resource descriptions in a format specific to that resource description and discovery protocol;
   generate advertisements in a uniform description format for the discovered resources, wherein each advertisement includes information describing an associated resource, wherein to generate advertisements in a uniform description format for the discovered resources, the resource discovery and description mechanism is configured to translate resource descriptions in formats specific to the different resource description and discovery protocols into the uniform description format; and
   publish the advertisements in the uniform description format on the network for discovery by the nodes on the subnetworks, wherein the nodes are each configured to read resource descriptions in the uniform description format from discovered advertisements;
   wherein each advertisement comprises a universal unique identifier that uniquely identifies the associated resource on the network, and further wherein, to generate advertisements in a uniform description format for the discovered resources, the node on one of the subnetworks is configured to: if a discovered resource provides a universal unique identifier, use the provided universal unique identifier in the generated advertisement for the resource; if the discovered resource does not provide a universal unique identifier, generate a universal unique identifier for the resource.

15. The system as recited in claim 14, wherein each advertisement includes:
   one or more physical interface endpoints and one or more virtual interface endpoints for accessing a resource described by the advertisement;
   physical location information for the resource described by the advertisement; and
   metadata for the resource described by the advertisement, wherein the metadata includes one or more of a resource name and a resource type.

16. The system as recited in claim 14, wherein the advertisements are user-extensible to include additional information about a resource described by the advertisement.

17. The system as recited in claim 14, wherein the system is a peer node in a peer-to-peer networking environment implemented according to a peer-to-peer platform on the network.

18. The system as recited in claim 17, wherein the peer-to-peer platform is JXTA.

19. The system as recited in claim 14, wherein the advertisements are markup language documents.

20. The system as recited in claim 19, wherein the markup language is XML.

21. A network computing system, comprising:
   means for discovering resources on a plurality of subnetworks of a network, wherein each subnetwork comprises multiple nodes and one or more resources, wherein two or more of the subnetworks implement different resource description and discovery protocols within the subnetworks, wherein each resource description and discovery protocol is configured to generate resource descriptions in a format specific to that resource description and discovery protocol;
   means for generating advertisements in a uniform description format for the discovered resources, wherein each advertisement includes information describing an associated resource, and wherein each advertisement includes a universal unique identifier that uniquely identifies the associated resource on the network, wherein to generate advertisements in a uniform description format for the discovered resources, the means for generating advertisements is configured to translate resource descriptions in formats specific to the different resource description and discovery protocols into the uniform description format; and
   means for publishing the advertisements in the uniform description format on the network for discovery by the nodes on the subnetworks, wherein the nodes are each configured to read resource descriptions in the uniform description format from discovered advertisements, and further wherein, to generate advertisements in a uniform description format for the discovered resources, the node on one of the subnetworks is configured to: if a discovered resource provides a universal unique identifier, use the provided universal unique identifier in the generated advertisement for the resource; if the discovered resource does not provide a universal unique identifier, generate a universal unique identifier for the resource.

22. A computer-implemented method, comprising:
   discovering resources on a plurality of subnetworks of a network, wherein each subnetwork comprises multiple nodes and one or more resources, wherein two or more of the subnetworks implement different resource description and discovery protocols within the subnetworks, wherein each resource description and discovery protocol is configured to generate resource descriptions in a format specific to that resource description and discovery protocol;
   generating advertisements in a uniform description format for the discovered resources, wherein each advertisement includes information describing an associated resource, wherein said generating advertisements in a uniform description format for the discovered resources comprises translating resource descriptions in formats specific to the different resource description and discovery protocols into the uniform description format; and
   publishing the advertisements in the uniform description format on the network for discovery by the nodes on the subnetworks, wherein the nodes are each configured to read resource descriptions in the uniform description format from discovered advertisements;

wherein each advertisement includes a universal unique identifier that uniquely identifies the associated resource on the network, and further wherein, to generate advertisements in a uniform description format for the discovered resources, the node on one of the subnetworks is configured to: if a discovered resource provides a universal unique identifier, use the provided universal unique identifier in the generated advertisement for the resource; if the discovered resource does not provide a universal unique identifier, generate a universal unique identifier for the resource.

23. The computer-implemented method as recited in claim 22, wherein each advertisement identifies one or more physical interface endpoints and one or more virtual interface endpoints for accessing a resource described by the advertisement.

24. The computer-implemented method as recited in claim 22, wherein each advertisement includes physical location information for a resource described by the advertisement.

25. The computer-implemented method as recited in claim 22, wherein each advertisement includes metadata for a resource described by the advertisement, wherein the metadata includes one or more of a resource name and a resource type.

26. The computer-implemented method as recited in claim 22, wherein the advertisements are user-extensible to include additional information about a resource described by the advertisement.

27. The computer-implemented method as recited in claim 22, wherein the resources include devices and services.

28. The computer-implemented method as recited in claim 22, wherein one or more of the nodes are peer nodes in a peer-to-peer networking environment implemented according to a peer-to-peer platform on the network.

29. The computer-implemented method as recited in claim 28, wherein the peer-to-peer platform is JXTA.

30. The computer-implemented method as recited in claim 22, wherein each universal unique identifier incorporates data specific to the associated resource.

31. The computer-implemented method as recited in claim 30, wherein the data specific to the associated resource includes one or more of a serial number for the resource and a MAC address for the resource.

32. The computer-implemented method as recited in claim 22, further comprising:

one of the nodes on one of the subnetworks discovering a published advertisement for a resource on one of the subnetworks using one or more characteristics of the resource included in the information describing the resource; and the one of the nodes accessing the resource associated with the discovered advertisement according to the information describing the resource in the discovered advertisement.

33. The computer-implemented method as recited in claim 22, wherein the advertisements are markup language documents.

34. The computer-implemented method as recited in claim 33, wherein the markup language is XML.

35. A computer-accessible storage medium storing program instructions, wherein the program instructions are computer-executable to implement:

discovering resources on a plurality of subnetworks of a network, wherein each subnetwork comprises multiple nodes and one or more resources, wherein two or more of the subnetworks implement different resource description and discovery protocols within the subnetworks, wherein each resource description and discovery protocol is configured to generate resource descriptions in a format specific to that resource description and discovery protocol;

generating advertisements in a uniform description format for the discovered resources, wherein each advertisement includes information describing an associated resource, wherein said generating advertisements in a uniform description format for the discovered resources comprises translating resource descriptions in formats specific to the different resource description and discovery protocols into the uniform description format; and publishing the advertisements in the uniform description format on the network for discovery by the nodes on the subnetworks, wherein the nodes are each configured to read resource descriptions in the uniform description format from discovered advertisements;

wherein each advertisement includes a universal unique identifier that uniquely identifies the associated resource on the network, and further wherein, to generate advertisements in a uniform description format for the discovered resources, the node on one of the subnetworks is configured to: if a discovered resource provides a universal unique identifier, use the provided universal unique identifier in the generated advertisement for the resource; if the discovered resource does not provide a universal unique identifier, generate a universal unique identifier for the resource.

36. The computer-accessible storage medium as recited in claim 35, wherein each advertisement includes:

one or more physical interface endpoints and one or more virtual interface endpoints for accessing a resource described by the advertisement;

physical location information for the resource described by the advertisement; and metadata for the resource described by the advertisement, wherein the metadata includes one or more of a resource name and a resource type.

37. The computer-accessible storage medium as recited in claim 35, wherein the advertisements are user-extensible to include additional information about a resource described by the advertisement.

38. The computer-accessible storage medium as recited in claim 35, wherein the resources include devices and services.

39. The computer-accessible storage medium as recited in claim 35, wherein one or more of the nodes are peer nodes in a peer-to-peer networking environment implemented according to a peer-to-peer platform on the network.

40. The computer-accessible storage medium as recited in claim 39, wherein the peer-to-peer platform is JXTA.

41. The computer-accessible storage medium as recited in claim 35, wherein each universal unique identifier incorporates data specific to the associated resource.

42. The computer-accessible storage medium as recited in claim 35, wherein the advertisements are markup language documents.

43. The computer-accessible storage medium as recited in claim 42, wherein the markup language is XML.

* * * * *

UNITED STATES PATENT AND TRADEMARK OFFICE
CERTIFICATE OF CORRECTION

PATENT NO. : 7,656,822 B1  Page 1 of 1
APPLICATION NO. : 10/974246
DATED : February 2, 2010
INVENTOR(S) : AbdelAziz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1444 days.

Signed and Sealed this

Thirtieth Day of November, 2010

David J. Kappos
*Director of the United States Patent and Trademark Office*